United States Patent
Hasegawa et al.

(10) Patent No.: US 9,664,830 B2
(45) Date of Patent: May 30, 2017

(54) OPTICAL FILTER AND SOLID-STATE IMAGING DEVICE

(71) Applicant: ASAHI GLASS COMPANY, LIMITED, Chiyoda-ku (JP)

(72) Inventors: Makoto Hasegawa, Chiyoda-ku (JP); Kenta Sekikawa, Chiyoda-ku (JP); Satoshi Kashiwabara, Chiyoda-ku (JP); Hiroshi Shimoda, Chiyoda-ku (JP); Yuriko Kaida, Chiyoda-ku (JP); Hiroshi Kumai, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 741 days.

(21) Appl. No.: 13/972,056

(22) Filed: Aug. 21, 2013

(65) Prior Publication Data

US 2014/0055652 A1 Feb. 27, 2014

(30) Foreign Application Priority Data

Aug. 27, 2012 (JP) .................................. 2012-186470

(51) Int. Cl.
*G02B 5/28* (2006.01)
*G02B 1/113* (2015.01)
(Continued)

(52) U.S. Cl.
CPC .............. *G02B 5/281* (2013.01); *G02B 1/113* (2013.01); *G02B 1/115* (2013.01); *G02B 5/208* (2013.01); *G02B 5/223* (2013.01); *H04N 5/335* (2013.01)

(58) Field of Classification Search
None
See application file for complete search history.

(56) References Cited

U.S. PATENT DOCUMENTS 3,702,783 A * 11/1972 Hartlein .................. C03C 17/30
427/215
4,179,537 A * 12/1979 Rykowski ......... B32B 17/10688
106/287.16
(Continued)

FOREIGN PATENT DOCUMENTS

AR 2011-133851 7/2011
CN 102262254 A * 11/2011
(Continued)

OTHER PUBLICATIONS

Machine translation of CN 102262254 A, Jan. 2017.*
(Continued)

*Primary Examiner* — Nicole M Buie-Hatcher
(74) *Attorney, Agent, or Firm* — Oblon, McClelland, Maier & Neustadt, L.L.P.

(57) ABSTRACT

An optical filter including a near infrared absorbing layer on a glass substrate, in which adhesiveness between the glass substrate and the near infrared absorbing layer is firm, high reliability is enabled in uses under a high temperature and high humidity environment, and manufacturing yield is secured, and a high reliability solid-state imaging device having the optical filter are provided. An optical filter includes: a glass substrate; and a near infrared absorbing layer formed on one principal surface of the glass substrate, wherein the near infrared absorbing layer is obtained by reacting a composition for forming the near infrared absorbing layer on the glass substrate and the composition contains a transparent resin having a fluorene skeleton and a reactivity group; a near infrared absorbing dye; and a silane coupling agent and/or oligomer thereof having a hydrolyzable group and a functional group which have reactivity for the reactivity group.

12 Claims, 5 Drawing Sheets

(51) Int. Cl.
*G02B 1/115* (2015.01)
*G02B 5/22* (2006.01)
*H04N 5/335* (2011.01)
*G02B 5/20* (2006.01)

(56) References Cited

U.S. PATENT DOCUMENTS

| | | | |
|---|---|---|---|
| 5,543,086 A | | 8/1996 | Bertelson et al. |
| 6,255,031 B1 | * | 7/2001 | Yao ................... B32B 17/10018 430/270.1 |
| 2007/0293606 A1 | * | 12/2007 | Yamada ............. C08G 64/0208 524/88 |
| 2008/0085955 A1 | | 4/2008 | Yanagida et al. |
| 2011/0151379 A1 | | 6/2011 | Choi et al. |

FOREIGN PATENT DOCUMENTS

| | | | |
|---|---|---|---|
| EP | 1 808 461 A1 | 7/2007 | |
| JP | 2004-12592 | 1/2004 | |
| JP | 2005-162735 | 6/2005 | |
| JP | 4031094 | 10/2007 | |
| JP | 4759680 | 6/2011 | |
| JP | 2011-202127 | 10/2011 | |
| JP | 2012-008532 | 1/2012 | |
| WO | WO 2012169447 A1 * | 12/2012 | ........... G02B 13/004 |

OTHER PUBLICATIONS

Machine translation of JP 2005-162785 A, Jan. 2017.*
U.S. Appl. No. 14/099,328, filed Dec. 6, 2013, Hasegawa, et al.
Hui Zhang, et al., "Amino Acid Promoted CuI-Catalyzed C—N Bond Formation between Aryl Halides and Amines or N-Containing Heterocycles", JOC Article, J. Org. Chem., vol. 70, No. 13, 2005, pp. 5164-5173.
Japanese Office Action issued Dec. 6, 2016, in corresponding Japanese Patent Application No. 2013-168825 (with English-language Translation).

* cited by examiner

OPTICAL FILTER AND SOLID-STATE IMAGING DEVICE

CROSS-REFERENCE TO RELATED APPLICATION

This application is based upon and claims the benefit of priority from Japanese Patent Application No. 2012-186470, filed on Aug. 27, 2012; the entire contents of all of which are incorporated herein by reference.

FIELD

The present invention relates generally to an optical filter having a near infrared shielding effect and to a solid-state imaging device using it.

BACKGROUND

In recent years, an optical filter in which light in a visible wavelength region (450 nm to 600 nm) is fully transmitted but light in a near-infrared wavelength region (700 nm to 1100 nm) is shielded has been used for various uses.

For example, in imaging devices such as a digital still camera, a digital video using a solid-state image sensor (CCD, CMOS and so on) and a display device such as an automatic exposure meter using a light-receiving element, the optical filter as stated above is disposed between an imaging lens and the solid-state image sensor or the light-receiving element so as to make sensitivity of the solid-state image sensor or the light-receiving element approximate to visibility of a human being. Besides, in a PDP (plasma display panel), the optical filter is disposed at a front surface (visible side) to prevent a malfunction of a remote control unit for a home electric appliance activated by the near infrared.

Among the above, a glass filter in which CuO and so on is added to a fluorophosphate-based glass and a phosphate-based glass so as to selectively absorb the light in the near infrared wavelength region is known as the optical filter for the imaging device, but a light-absorption type glass filter is expensive and it is difficult to reduce a thickness thereof, so there has been a problem that it is impossible to enough correspond to requirements for downsizing and reduction in thickness of the imaging device in recent years.

Accordingly, a reflection-type interference filter in which, for example, a silicon oxide ($SiO_2$) layer and a titanium oxide ($TiO_2$) layer are alternately stacked on a substrate to reflect and shield the light in the near infrared wavelength region by interference of light, a film in which dye absorbing the light in the near infrared wavelength region is contained in a transparent resin, and so on are developed to solve the above-stated problems. Besides, an optical filter in which the above are combined such that a resin layer containing the dye absorbing the near infrared and a layer reflecting the near infrared are stacked is also developed.

Among the above, a technology in which a polyester resin and a polycarbonate resin having a fluorene skeleton whose refractive index is high and heat resistance is excellent are used as the transparent resin in a film containing the dye absorbing the light in the near infrared wavelength region in the transparent resin has been developed. Besides, a technology of an anti-reflection composite function film in which an acrylic resin having the fluorene skeleton is used as a high refractive index layer of an anti-reflection film in which the high refractive index layers and low refractive index film layers are alternately stacked in consideration of an abrasion resistance, a chemical resistance, and so on in addition to the above-stated characteristics and further, a function of the optical filter is added to the high refractive index layer by making it contain a near infrared absorbent has been developed.

However, when the optical filter is enabled by forming the resin layer in which the near infrared absorbent is contained in the transparent resin having the fluorene skeleton on a glass substrate, there is a case when a problem occurs in adhesiveness, particularly in adhesiveness when it is exposed under a high-temperature and high-humidity environment for a long time, and it cannot necessarily be said that it has enough reliability. Besides, when the adhesivenesses between the resin layer and the glass substrate and between the resin layer and the anti-reflection film are insufficient, there is a problem in manufacturing to incur deterioration in yield when a base material obtained in a large size is cut by dicing to process into a production size.

SUMMARY

An object of the present invention is to provide an optical filter in which adhesiveness between a glass substrate and a near infrared absorbing layer is firm in the optical filter having the near infrared absorbing layer using a transparent resin having a fluorene skeleton on the glass substrate, with high reliability particularly when it is used under a high-temperature and high-humidity environment, and a manufacturing yield thereof is secured, and a high reliability solid-state imaging device having the optical filter.

The present invention provides an optical filter and a solid-state imaging device having the following constitution.

[1] An optical filter, includes: a glass substrate; and a near infrared absorbing layer formed on one principal surface of the glass substrate, wherein the near infrared absorbing layer is obtained by reacting a composition for forming the near infrared absorbing layer on the glass substrate and the composition contains a transparent resin having a fluorene skeleton and a reactivity group; a near infrared absorbing dye; and a silane coupling agent and/or oligomer thereof having a hydrolyzable group and a functional group which have reactivity for the reactivity group.

[2] The optical filter according to [1], wherein the transparent resin is selected from an acrylic resin, a polycarbonate resin, and a polyester resin.

[3] The optical filter according to [1], wherein the transparent resin is a polyester resin.

[4] The optical filter according to [1], wherein the composition contains the near infrared absorbing dye at a ratio of 0.2 parts by mass to 10 parts by mass, the silane coupling agent and/or oligomer thereof at a ratio of 0.1 parts by mass to 30 parts by mass relative to 100 parts by mass of the transparent resin.

[5] The optical filter according to [1], wherein the composition contains the silane coupling agent and/or oligomer thereof at a ratio of 0.5 parts by mass to 15 parts by mass relative to 100 parts by mass of the transparent resin.

[6] The optical filter according to [1], wherein the near infrared absorbing dye contains a near infrared absorbing dye (B1) whose absorption spectrum of light in wavelength region of 400 nm to 1000 nm measured by dissolving into a solvent for the dye whose refractive index ($n_{20}d$) is less than 1.500, the absorption spectrum having a maximum absorption peak, the peak having the maximum absorption at wavelength within a region of 695 nm to 720 nm, the peak having a full width at half maximum is 60 nm or less, and the peak having a value obtained by dividing a difference between an absorbance at 630 nm calculated by setting a maximum absorbance as "1" and the maximum absorbance being "1" by difference between 630 nm and the wavelength at maximum absorption is 0.01 to 0.05, wherein a refractive index ($n_{20}d$) of the transparent resin is 1.54 or more, and wherein in the near infrared absorbing layer, a transmittance of visible light at 450 nm to 600 nm is 70% or more, a transmittance of light in a wavelength region of 695 nm to 720 nm is 10% or less, and a variation D of the transmittance expressed by the following expression (1) is −0.8 or less, $$D\ (\%/\text{nm})=[T_{700}\ (\%)-T_{630}\ (\%)]/[700\ (\text{nm})-630\ (\text{nm})] \quad (1)$$

In the expression (1), $T_{700}$ is a transmittance at a wavelength of 700 nm in a transmission spectrum of the near infrared absorbing layer, and $T_{630}$ is a transmittance at a wavelength of 630 nm in the transmission spectrum of the near infrared absorbing layer.

[7] The optical filter according to [6], wherein the maximum absorption peak in the absorption spectrum of the near infrared absorbing dye (B1) has the maximum absorption at wavelength within a region of 700 nm to 720 nm, and the variation D of the transmittance of the near infrared absorbing layer expressed by the expression (1) is −0.86 or less.

[8] The optical filter according to [6], wherein the near infrared absorbing dye (B1) consists of at least one kind selected from a squarylium-based compound expressed by the following general formula (F1);

[Chemical Formula 1]

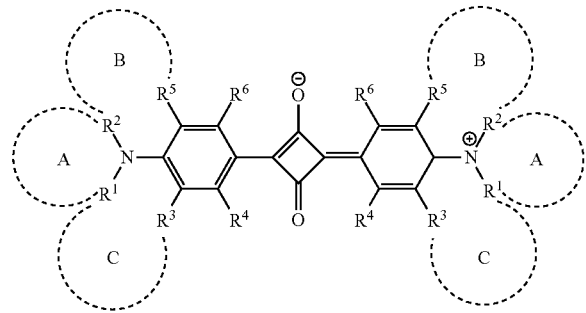

(F1)

In the formula (F1), symbols are as follows. $R^4$ and $R^6$ each independently represent a hydrogen atom, a halogen atom, an alkyl group or an alkoxy group having 1 to 6 carbon atoms, or —$NR^7R^8$ (where $R^7$ and $R^8$ each independently represent a hydrogen atom, an alkyl group having 1 to 20 carbon atoms, or —C(=O)—$R^9$ (where $R^9$ represents a hydrogen atom, an alkyl group having 1 to 20 carbon atoms or an aryl group or an alaryl group having 6 to 11 carbon atoms which may have a substituent)). $R^1$ and $R^2$, $R^2$ and $R^5$, and $R^1$ and $R^3$ may each independently form a heterocycle A, a heterocycle B, and a heterocycle C respectively having 5 or 6 members including a nitrogen atom by coupling with each other, and the formula (F1) has at least one ring structure selected from the heterocycle A, the heterocycle B, and the heterocycle C.

$R^1$ and $R^2$ when the heterocycle A is formed are a divalent group -Q- in which they are bonded, and represent an alkylene group or an alkyleneoxy group in which a hydrogen atom may be substituted by an alkyl group having 1 to 6 carbon atoms or an aryl group having 6 to 10 carbon atoms. $R^2$ and $R^5$ when the heterocycle B is formed and $R^1$ and $R^3$ when the heterocycle C is formed are respectively divalent groups —$X^1$—$Y^1$— and —$X^2$—$Y^2$— (respective sides bonded to nitrogen are $X^1$ and $X^2$) in which they are bonded, and $X^1$ and $X^2$ are each expressed by the following formula (1x) or (2x), and $Y^1$ and $Y^2$ are each expressed by any one selected from the following formulas (1y) to (5y), and when each of $X^1$ and $X^2$ is expressed by the formula (2x), each of $Y^1$ and $Y^2$ may be a single bond.

[Chemical Formula 2]

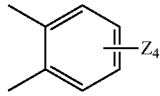

(1x)

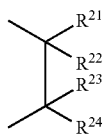

(2x)

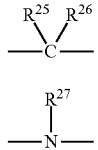

(1y)

(2y)

(3y)

(4y)

(5y)

In the formula (1x), four Z each independently represent a hydrogen atom, a hydroxyl group, an alkyl group or an alkoxy group having 1 to 6 carbon atoms, or —$NR^{28}R^{29}$ (where $R^{28}$ and $R^{29}$ each independently represent a hydrogen atom or an alkyl group having 1 to 20 carbon atoms), $R^{21}$ to $R^{26}$ each represent a hydrogen atom, an alkyl group having 1 to 6 carbon atoms or an aryl group having 6 to 10 carbon atoms, and $R^{27}$ represents an alkyl group having 1 to 6 carbon atoms or an aryl group having 6 to 10 carbon atoms. $R^7$, $R^8$, $R^9$, $R^4$, $R^6$, $R^{21}$ to $R^{27}$, $R^1$ to $R^3$ when the heterocycle is not formed, and $R^5$ may form a 5-membered ring or a 6-membered ring by being bonded to any of the others among these with each other. $R^{21}$ and $R^{26}$, $R^{21}$ and $R^{27}$ may be bonded directly.

$R^1$ and $R^2$ when the heterocycle is not formed each independently represent a hydrogen atom, an alkyl group having 1 to 6 carbon atoms which may have a substituent, an allyl group, an aryl group or an alaryl group having 6 to 11 carbon atoms, $R^3$ and $R^5$ when the heterocycle is not formed each independently represent a hydrogen atom, a halogen atom, or an alkyl group or an alkoxy group having 1 to 6 carbon atoms.

[9] The optical filter according to [8], wherein the functional group of the silane coupling agent and/or oligomer thereof is an epoxy group or a (metha)acryloxy group.

[10] The optical filter according to [1], wherein a thickness of the near infrared absorbing layer is 0.5 μm to 100 μm.

[11] The optical filter according to [1], further includes: a dielectric multilayered film on a surface of the near infrared absorbing layer which is opposite to a surface on the glass substrate.

[12] A solid-state imaging device, includes: a lens; the optical filter according to [1]; and a solid-state image sensor disposed on an optical axis of light incident from an object side or a light source side in this sequence.

Here, in this specification, when transmittance at a specific wavelength region is, for example, 70% or more means that the transmittance is not less than 70% at all wavelengths in the wavelength region, and similarly, when the transmittance is 10% or less means that the transmittance does not exceed 10% at all wavelengths in the wavelength region.

According to the present invention, in an optical filter having a near infrared absorbing layer using a transparent resin having a fluorene skeleton on a glass substrate, it is possible to provide the optical filter in which adhesivenesses between the glass substrate and the near infrared absorbing layer, and between the near infrared absorbing layer and a dielectric multilayered film when the dielectric multilayered film is held to be in contact with the near infrared absorbing layer are firm, high reliability is held even in use particularly under a high-temperature and high-humidity environment, and manufacturing yield is also secured, and a high reliability solid-state imaging device having the optical filter.

DETAILED DESCRIPTION

Hereinafter, embodiments of the present invention are described. Incidentally, the present invention is not intended to be limited to the following description.
(Optical Filter)

An optical filter according to the embodiments includes a glass substrate and a near infrared absorbing layer formed on one principal surface of the glass substrate. The near infrared absorbing layer is obtained by reacting a composition for forming the near infrared absorbing layer on the glass substrate. The composition for forming the near infrared absorbing layer contains a transparent resin having a fluorene skeleton and a reactivity group, a near infrared absorbing dye, and a silane coupling agent and/or oligomer thereof having a hydrolyzable group and a functional group which have reactivity for the reactivity group.

Generally, when various kinds of resin layers are provided at a surface of the glass substrate, especially when a resin layer having optical characteristics such as a resin layer made of the transparent resin having the fluorene skeleton with the near infrared absorbing dye is provided, various kinds of surface treatments are performed for the surface of the glass substrate, and the resin layer is formed thereon to improve the adhesiveness. However, the present situation is that it is impossible to correspond to a specification in which further high adhesive characteristics are required though the adhesiveness at a certain level can be obtained by the above-stated method. Besides, enough adhesiveness cannot be obtained at a cutting time and at a high-temperature and high-humidity test as for the adhesiveness between the resin layer and a dielectric multilayered film when the dielectric multilayered film is further disposed on the resin layer in the above-stated constitution.

In the present invention, it is enabled to improve the adhesiveness between the glass substrate and the near infrared absorbing layer compared to the above-stated surface treatment while fully securing the optical characteristics and operability. In addition, improvement of the adhesiveness between the resin layer and the dielectric multilayered film becomes possible when the dielectric multilayered film is further disposed on the resin layer. The improvement of the adhesiveness is because the composition for forming the near infrared absorbing layer contains a transparent resin having a fluorene skeleton and a reactivity group, a near infrared absorbing dye, and a silane coupling agent and/or oligomer thereof having a hydrolyzable group and a functional group which have reactivity for the reactivity group of the transparent resin.

Figure 1:
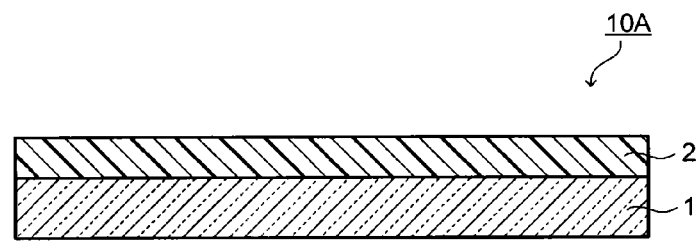
FIG. 1 is a sectional view schematically illustrating an example of an embodiment of an optical filter according to the present invention.

Hereinafter, embodiments of the optical filter according to the present invention are described with reference to the drawings. FIG. 1 is a sectional view schematically illustrating an example of the embodiment of the optical filter according to the present invention. An optical filter 10A illustrated in FIG. 1 is made up of a glass substrate 1 and a near infrared absorbing layer 2 formed on one principal surface thereof.
(Glass Substrate)

As the glass substrate 1, a kind of a glass is not particularly limited as long as light in a visible wavelength region (450 nm to 600 nm) is enough transmitted for an extent in which a function of the optical filter 10A can be carried out when the glass substrate 1 is combined with the near infrared absorbing layer 2 to be the optical filter 10A. A material of the glass is not particularly limited, and a normal soda lime glass, borosilicate glass, non-alkali glass, quartz glass, and so on can be used. Further, it may be an absorption-type glass having absorption characteristics for wavelengths in an ultraviolet region and/or a near infrared region, for example, a fluorophosphate-based glass, a phosphate-based glass, and so on which is containing CuO and the like.

It is possible to appropriately select and use characteristics such as whether or not an alkaline component is contained and a value of a linear expansion coefficient for the glass substrate 1 from transparent materials in the visible wavelength region while considering a device to be used, a place to be disposed, and so on. In particular, the borosilicate glass is preferable because a processing is easy, and occurrences of scratches, foreign particles, and so on at an optical surface can be suppressed. Besides, the non-alkali glass which does not contain the alkaline component is preferable because it is possible to exclude an influence caused by alkaline elution under a manufacturing environment and a usage environment, and adhesiveness, weather resistance, and so on are thereby improved.

A size of the glass substrate 1 is set to be the same as a size used as the optical filter, and it is appropriately adjusted in accordance with a device to be used and so on. A thickness of the glass substrate 1 is preferably within a range of 0.03 mm to 5 mm from points of view of downsizing and reduction in thickness of the device, and suppressing a breakage at a handling time, and it is more preferably within a range of 0.05 mm to 1 mm from points of view of reduction in weight and strength thereof.

There is a case when a glass substrate 1 side of the optical filter 10A is directly adhered to be used to, for example, a solid-state image sensor of an imaging device. In this case, it is preferable that a difference between the linear expansion coefficient of the glass substrate 1 and a linear expansion coefficient of a part to be adhered is $30 \times 10^{-7}$/K or less from a point of view of suppressing peeling and so on after adhesion. For example, when a material of the part to be adhered is silicon, a material whose linear expansion coefficient is approximately $30 \times 10^{-7}$/K to $40 \times 10^{-7}$/K, for example, glasses such as AF33 and Tempax manufactured by Schott Co., Ltd., and SW-3, SW-Y, SW-YY, AN100 and EN-A1 manufactured by Asahi Glass Co., Ltd. (they are brand names) are suitable as the material of the glass substrate 1. When the material of the part to be adhered is a ceramics such as alumina, a material whose linear expansion coefficient is approximately $50 \times 10^{-7}$/K to $80 \times 10^{-7}$/K, for example, glasses such as D263 and B270 manufactured by Schott Co., Ltd., and FP1 and FP01eco manufactured by Asahi Glass Co., Ltd. are suitable as the material of the glass substrate 1.

(Near Infrared Absorbing Layer)

The near infrared absorbing layer 2 formed on one principal surface of the glass substrate 1 is a layer obtained by reacting the composition for forming the near infrared absorbing layer on the glass substrate. The composition for forming the near infrared absorbing layer contains a transparent resin having a fluorene skeleton and a reactivity group, a near infrared absorbing dye, and a silane coupling agent and/or oligomer thereof having a hydrolyzable group and a functional group which have reactivity for the reactivity group of the transparent resin. Note that obtaining the near infrared absorbing layer by reacting the composition for forming the near infrared absorbing layer means that a reactivity component in the composition is reacted when the near infrared absorbing layer is formed by using the composition. Besides, the reaction of the reactivity component includes a reaction at an interface with the other layers such as the glass substrate with which the near infrared absorbing layer is in contact. Further, the composition for forming the near infrared absorbing layer contains a solvent as necessary, besides the above-stated each component. Hereinafter, each component contained in the composition for forming the near infrared absorbing layer is described.

(1) Transparent Resin

The transparent resin is a component having a fluorene skeleton and a reactivity group, and for forming the near infrared absorbing layer by reacting on the glass substrate. The resin having fluorene skeleton has high refractive index and high heat resistance. Therefore it is possible for the near infrared absorbing layer which is made from the resin having fluorene skeleton to have also high refractive index and high heat resistance. For example the reactivity group is the reactivity group which does not take part in a manufacturing reaction (for example polymerization reaction) among reactivity groups of a raw material component when the transparent resin is manufactured, and is remaining at terminals and so on of a main chain or a side chain of the obtained transparent resin. Further, the transparent resin preferably includes a thermoplastic resin, and more preferably includes a thermoplastic resin having fluorene skeleton (hereinafter, referred to also as a thermoplastic resin (A1)). Note that the thermoplastic resin essentially has the reactivity group derived from the raw material generally independent from a kind and a manufacturing method thereof.

As the thermoplastic resin (A1), it is not particularly limited as long as it is the thermoplastic resin having the fluorene skeleton expressed by the following formula (F2). The thermoplastic resin (A1) is not particularly limited as long as it is specifically the thermoplastic resin (A1) obtained by using the component having the fluorene skeleton as the raw material component. Note that a component having a 9,9-bisphenylfluorene skeleton expressed by the following formula (F3) is preferable from among the components having the fluorene skeleton because a higher refractive index and heat resistance can be obtained.

[Chemical Formula 3]

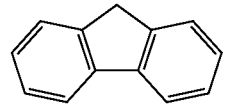

(F2)

[Chemical Formula 4]

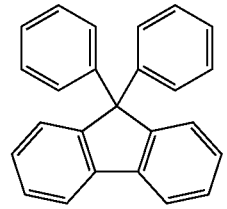

(F3)

As the thermoplastic resin (A1) obtained by using the component having the above-stated fluorene skeleton, an acrylic resin, a polycarbonate resin, and a polyester resin are preferable.

As the acrylic resin, for example, an acrylic resin obtained by polymerizing a raw material component containing a 9,9-bisphenylfluorene derivative in which one substituent having a (metha)acryloyl group at a terminal is each introduced into at least two of phenyl groups of 9,9-bisphenylfluorene can be used. The "(metha)acryloyl . . . " in this specification is a generic of a "methacryloyl . . . " and the "acryloyl . . . ".

Besides, an acrylic resin obtained by polymerizing a compound in which a hydroxyl group is introduced into the 9,9-bisphenylfluorene derivative having the (metha)acryloyl group with an urethane (metha) acrylate compound may be used. As the urethane (metha)acrylate compound, a compound obtained as a reaction product of the (metha)acrylate compound having the hydroxyl group and a polyisocyanate compound, a compound obtained as a reaction product of the (metha) acrylate compound having the hydroxyl group, the polyisocyanate compound, and a polyol compound can be used.

As the polycarbonate resin, a polycarbonate resin obtained by polymerization using a carbonate forming component and a diol component being general raw material components of the polycarbonate resin in which either raw material components having the 9,9-bisphenylfluorene skeleton can be used. A polycarbonate resin obtained by polymerization using the 9,9-bis(hydroxyalkoxyphenyl)fluorenes as the diol component, and carbonates such as generally used phosgens, diphenylcarbonate as the carbonate forming component can be preferably used.

As the polyester resin, a polyester resin obtained by polycondensation using a dicarboxylic acid component and a diol component being general raw material components of the polyester resin in which either raw material components having the 9,9-bisphenylfluorene skeleton can be used. A polyester resin obtained by polycondensation using the 9,9-bis(hydroxyalkoxyphenyl)fluorenes as the diol component, and the generally used dicarboxylic acids or ester-forming dicarboxylic acid derivatives as the dicarboxylic acid component can be preferably used.

The thermoplastic resin (A1) used for the embodiments of the present invention is a resin whose refractive index is high because of having the above-stated fluorene skeleton. In the embodiments of the present invention, one kind of the above-stated thermoplastic resin (A1) may be used independently or two or more kinds may be combined to be used.

Here, the refractive index ($n_{20}d$) of the transparent resin used for the formation of the near infrared absorbing layer is preferably 1.54 or more, more preferably 1.55 or more, and particularly preferably 1.56 or more from a point of view of obtaining good optical characteristics. Note that in this specification, the refractive index ($n_{20}d$) is a refractive index measured at 20° C. by using light of wavelength 589 nm. Besides, in this specification, the refractive index means the refractive index ($n_{20}d$) unless otherwise noted. An upper limit of the refractive index of the transparent resin is not particularly set, but it is approximately 1.72 from a point of view of easiness to obtain, and so on.

Accordingly, it is preferable that the refractive index of the thermoplastic resin (A1) contained by the transparent resin is similar to that of the transparent resin. Note that in the thermoplastic resin (A1), it is possible to adjust the refractive index by a method such that a blending amount of the component having the fluorene skeleton within the raw material component is appropriately adjusted within a manufacturable range. Besides, all of the acrylic resin, the polycarbonate resin, and the polyester resin exemplified as the thermoplastic resin (A1) obtained by using the component having the fluorene skeleton are also excellent in a point of transparency, and they are suitable as the transparent resin used for the formation of the near infrared absorbing layer.

Further, a molecular weight of the thermoplastic resin (A1) used for the embodiments is not particularly limited, but a number average molecular weight is preferably 1,000 to 500,000, more preferably 3,000 to 50,000 as for any of the exemplified thermoplastic resins. When the number average molecular weight lowers the above-stated lower limit, it becomes fragile and cracks may occur, when it exceeds the upper limit, it is possible that molten fluidity is lowered, and molding workability or solubility to solvent deteriorates.

As the above-stated thermoplastic resin (A1), ones in which OGSOL EA-F5503 (brand name, manufactured by Osaka Gas Chemicals Co., Ltd., refractive index: 1.60), OGSOL EA-F5003 (brand name, manufactured by Osaka Gas Chemicals Co., Ltd., refractive index: 1.59), and so on are cured can be used as the acrylic resin. As the polycarbonate-based resin, LEXANML9103 (brand name, manufactured by SABIC Co., Ltd., refractive index: 1.59), as an polymer alloy, Panlite AM-8 series (brand name, manufactured by Teijin Co., Ltd.) and XYLEX 7507 (brand name, manufactured by SABIC Co., Ltd.) can be used as an alloy of polycarbonate and polyester. As the polyester resin, OKPH4HT (brand name, manufactured by Osaka Gas Chemicals Co., Ltd., refractive index: 1.64), OKPH4 (brand name, manufactured by Osaka Gas Chemicals Co., Ltd., refractive index: 1.61), B-OKP2 (brand name, manufactured by Osaka Gas Chemicals Co., Ltd., refractive index: 1.64), and so on can be used.

The transparent resin contained by the composition for forming the near infrared absorbing layer may contain a thermoplastic resin other than the thermoplastic resin (A1) within a range not disturbing an effect of the present invention in addition to the thermoplastic resin (A1). Namely, when the thermoplastic resin other than the thermoplastic resin (A1) is set to be a thermoplastic resin (A2), the transparent resin may consist of only the thermoplastic resin (A1), or may consist of the thermoplastic resin (A1) and the thermoplastic resin (A2).

It is preferred that the thermoplastic resin (A2) has the transparency, and when the thermoplastic resin (A2) is used together with the thermoplastic resin (A1) refractive index of the obtained transparent resin is preferably 1.54 or more, more preferably 1.55 or more, and particularly preferably 1.56 or more. Specifically, the thermoplastic resins such as a polyester resin, a acrylic resin, a polyolefin resin, a polycarbonate resin, a polyamide resin, an alkyd resin which do not have the fluorene skeleton can be used. Among these, the acrylic resin, the polyester resin, the polycarbonate resin, and so on whose refractive indexes are 1.54 or more are preferably used from a point of view of the transparency, and further, the polyester resin whose refractive index is 1.54 or more is more preferably used.

As the thermoplastic resin (A2), commercial items may be used, and specifically, VYLON 103 (brand name, manufactured by TOYOBO Co., Ltd., refractive index: 1.55) and so on can be used as the polyester resin. Also as for the thermoplastic resin (A2), one kind may be used independently, or two or more kinds may be combined to be used.

As a ratio of the thermoplastic resin (A1) in the transparent resin contained by the composition for forming the near infrared absorbing layer, 5 mass to 100 mass % is preferable, and 50 mass to 100 mass is particularly preferable. Note that when the thermoplastic resin (A1) and the thermoplastic resin (A2) are combined to be used in the transparent resin, a combination of the same kind of transparent resins, for example, the combination between the acrylic resins, the combination between the polyester resins, and the combination between the polycarbonate resins are preferable.

(2) Near Infrared Absorbing Dye

The near infrared absorbing dye contained in the composition for forming the near infrared absorbing layer is not particularly limited as long as it is a near infrared absorbing dye having capability of enough transmitting the light in the visible wavelength region (450 nm to 600 nm) and enough absorbing the light in the near infrared wavelength region (700 nm to 1100 nm).

It is preferable to use a near infrared absorbing dye (B1) whose absorption spectrum of light in wavelength region of 400 nm to 1000 nm measured by dissolving into a solvent for the dye whose refractive index is less than 1.500, has a maximum absorption peak, which has the maximum absorption at wavelength within a region of 695 nm to 720 nm, a full width at half maximum is 60 nm or less, and a value obtained by dividing a difference between an absorbance at 630 nm calculated by setting a maximum absorbance as "1" and the maximum absorbance being "1" by difference between 630 nm and the wavelength of maximum absorption is 0.01 to 0.05, as the near infrared absorbing dye though it depends on the usages of the optical filter according to the embodiments, namely, the required near infrared absorbing characteristics.

In this specification, the near infrared absorbing dye is also referred to as an NIR absorbing dye. Besides, the absorption spectrum of the light in the wavelength region of 400 nm to 1000 nm measured by dissolving the NIR absorbing dye (B1) into the predetermined solvent for dye at a concentration in which the maximum absorption becomes "1" is called just as the absorption spectrum of the NIR absorbing dye (B1). Further, the wavelength at maximum absorption in the absorption spectrum of the NIR absorbing dye (B1) is referred to as a λmax of the NIR absorbing dye (B1) or a λmax (B1). It is also the same as for the NIR absorbing dyes other than the NIR absorbing dye (B1).

In the absorption spectrum of the NIR absorbing dye (B1), a value obtained by dividing a difference between the absorbance at 630 nm calculated by setting the absorbance at the λmax (B1) to be "1" (it is expressed as "$Bb_{63}$" in the following expression (2)) and the absorbance at the λmax (B1) being "1" with a wavelength difference between 630 nm and the λmax (B1) is hereinafter referred to as an "absorption spectrum slope". It is also the same as for the NIR absorbing dyes other than the NIR absorbing dye (B1). Note that when the absorption spectrum slope is expressed by a expression, it is expressed by the following expression (2).

$$\text{Absorption spectrum slope} = (1 - Bb_{630})/(\lambda\max(B1) - 630) \quad (2)$$

Besides, a variation D of transmittance expressed by the above-stated expression (1) at the near infrared absorbing layer is just referred to as the variation D of transmittance.

As the solvent for dye used to measure the absorption spectrum of the NIR absorbing dye (B1), it is not particularly limited as long as the refractive index thereof is less than 1.500 and it is the solvent for dye being able to solve the NIR absorbing dye (B1) to be measured. Specifically, alcohols such as methanol, ethanol, a ketone-based solvent such as acetone, a halogen-based solvent such as dichloromethane, an aromatic solvent such as toluene, an alicyclic solvent such as cyclohexanone can be used though it depends on a kind of the NIR absorbing dye (B1).

The λmax i.e. the wavelength at the maximum absorption in the absorption spectrum of the NIR absorbing dye (B1) is within a region of 695 nm to 720 nm. The λmax (B1) is preferably within a region of 700 nm to 720 nm. The full width at half maximum of the maximum absorption peak in the absorption spectrum of the NIR absorbing dye (B1) is 60 nm or less. The full width at half maximum is preferably 50 nm or less, and more preferably 35 nm or less. The absorption spectrum slope of the maximum absorption peak in the absorption spectrum of the NIR absorbing dye (B1) is 0.01 to 0.05. The absorption spectrum slope is preferably 0.01 to 0.03, and more preferably 0.010 to 0.014.

Besides, as the NIR absorbing dye (B1), it is preferable that there is no an absorption peak whose shape is sharp such that a full width at half maximum is 100 nm or less other than the maximum absorption peak in the absorption spectrum in addition that the absorption spectrum has the above-stated characteristics. The above-stated light absorption characteristics of the NIR absorbing dye (B1) match with optical characteristics whose absorbance steeply changes at around the wavelength of 630 nm to 700 nm which are required for a near infrared cutting filter.

In the optical filter according to the present embodiment, the NIR absorbing dye containing the NIR absorbing dye (B1) is used, this is dispersed in the transparent resin to form the near infrared absorbing layer, and thereby, the light absorption characteristics of the near infrared absorbing layer, namely, the light absorption characteristics in which the transmittance of visible light at 450 nm to 600 nm is 70% or more, the light transmittance at the wavelength region of 695 nm to 720 nm is 10% or less, and the variation D of the transmittance is −0.8 or less are enabled.

Namely, the NIR absorbing dye (B1) has functions to set a visible wavelength band of 450 nm to 600 nm at the near infrared absorbing layer as high transmission, and a near infrared wavelength band of 695 nm to 720 nm as low transmission (light shielding), and to make a boundary area thereof steep. The NIR absorbing dye does not substantially contain the NIR absorbing dye which has the λmax at a short wavelength side than 695 nm being a minimum value of the λmax (B1) of the NIR absorbing dye (B1) so as not to disturb the functions of the NIR absorbing dye (B1) as stated above. The NIR absorbing dye may consist of only the NIR absorbing dye (B1) from this viewpoint.

As the NIR absorbing dye (B1), it is not particularly limited as long as it is a compound having the above-stated light absorption characteristics. It is possible to appropriately select and use a compound having the above-stated light absorption characteristics from a cyanine-based compound, a phthalocyanine-based compound, a naphthalocyanine-based compound, a dithiol metal complex-based compound, a diimonium-based compound, a polymethine-based compound, a phthalide compound, a naphthoquinone-based compound, an anthraquinone-based compound, an indophenol-based compound, a squarylium-based compound, and so on which are generally used as the NIR absorbing dyes. Among these, the squarylium-based compound is particularly preferable because it is possible to obtain the steep absorption slope at the wavelength band required as the NIR absorbing dye (B1), and to secure preservation stability and stability for light by adjusting a chemical structure thereof.

Specifically, at least one kind selected from the squarylium-based compound expressed by the following formula (F1) can be used as the NIR absorbing dye (B1). In this specification, a compound expressed by the formula (F1) is also referred to as a compound (F1). It is also the same as for the other compounds. The compound (F1) is the squarylium-based compound having a structure in which benzene rings are bonded at right and left of a squarylium skeleton, further, the nitrogen atom is bonded at 4-position of the benzene ring, and a saturated heterocycle containing the nitrogen atom is formed, and is a compound having the light absorption characteristics as the NIR absorbing dye (B1). In the compound (F1), a substituent of the benzene ring can be appropriately adjusted within the following range in accordance with the other required characteristics to enhance solubility for a transparent resin and a solvent (hereinafter, it is also referred to as a "host solvent") which are contained therewith when it is contained in the composition for forming the near infrared absorbing layer, and so on.

[Chemical Formula 5]

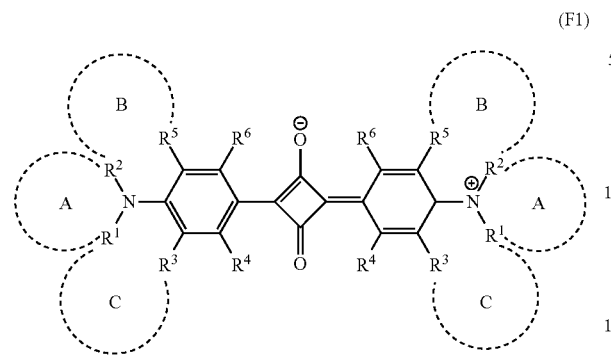

(F1)

Note that symbols in the formula (F1) are as described follows. $R^4$ and $R^6$ each independently represent a hydrogen atom, a halogen atom, an alkyl group or an alkoxy group having 1 to 6 carbon atoms, or $—NR^7R^8$ (where $R^7$ and $R^8$ each independently represent a hydrogen atom, an alkyl group having 1 to 20 carbon atoms, or $—C(=O)—R^9$ (where $R^9$ represents a hydrogen atom, an alkyl group having 1 to 20 carbon atoms or an aryl group or an alaryl group having 6 to 11 carbon atoms which may have a substituent)).

$R^1$ and $R^2$, $R^2$ and $R^5$, and $R^1$ and $R^3$ may each independently form a heterocycle A, a heterocycle B, and a heterocycle C respectively having 5 or 6 members including a nitrogen atom by coupling with each other. Note that the formula (F1) has at least one ring structure selected from the heterocycle A, the heterocycle B, and the heterocycle C. $R^1$ and $R^2$ when the heterocycle A is formed are a divalent group -Q- in which they are bonded, and represent an alkylene group or an alkyleneoxy group in which a hydrogen atom may be substituted by an alkyl group having 1 to 6 carbon atoms or an aryl group having 6 to 10 carbon atoms. $R^2$ and $R^5$ when the heterocycle B is formed and $R^1$ and $R^3$ when the heterocycle C is formed are respectively divalent groups $—X^1—Y^1—$ and $—X^2—Y^2—$ (respective sides bonded to nitrogen are $X^1$ and $X^2$) in which they are bonded, and $X^1$ and $X^2$ are each expressed by the following formula (1x) or (2x), and $Y^1$ and $Y^2$ are each expressed by any one selected from the following formulas (1y) to (5y). When each of $X^1$ and $X^2$ is expressed by the formula (2x), each of $Y^1$ and $Y^2$ may be a single bond.

[Chemical Formula 6]

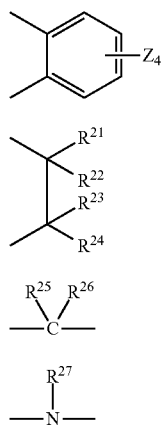

(1x)

(2x)

(1y)

(2y)

(3y)

(4y)

(5y)

In the formula (1x), four Z each independently represent a hydrogen atom, a hydroxyl group, an alkyl group or an alkoxy group having 1 to 6 carbon atoms, or $—NR^{28}R^{29}$ (where $R^{25}$ and $R^{29}$ each independently represent a hydrogen atom or an alkyl group having 1 to 20 carbon atoms), $R^{21}$ to $R^{26}$ represent a hydrogen atom, an alkyl group having 1 to 6 carbon atoms or an aryl group having 6 to 10 carbon atoms, and $R^{27}$ represents an alkyl group having 1 to 6 carbon atoms or an aryl group having 6 to 10 carbon atoms.

$R^7$, $R^8$, $R^9$, $R^4$, $R^6$, $R^{21}$ to $R^{27}$, $R^1$ to $R^3$ when the heterocycle is not formed, and $R^5$ may form a 5-membered ring or a 6-membered ring by being bonded to any of the others among these with each other. $R^{21}$ and $R^{26}$, $R^{21}$ and $R^{27}$ may be bonded directly. $R^1$ and $R^2$ when the heterocycle is not formed each independently represent a hydrogen atom, an alkyl group having 1 to 6 carbon atoms which may have a substituent, an allyl group, an aryl group or an alaryl group having 6 to 11 carbon atoms. $R^3$ and $R^5$ when the heterocycle is not formed each independently represent a hydrogen atom, a halogen atom, or an alkyl group or an alkoxy group having 1 to 6 carbon atoms. Hereinafter, the heterocycle A may be referred to just as a ring A. It is also the same as for the heterocycle B and the heterocycle C.

In the compound (F1), $R^4$ and $R^6$ each independently represent the above-stated atom or group. As the halogen atom, a fluorine atom, a chlorine atom, a bromine atom, and so on can be used. The alkyl group may be any of a straight chain state, a branched chain state, or a ring state. It is preferable that $R^4$ and $R^6$ are a combination in which one is the hydrogen atom and the other is $—NR^7R^8$.

When the compound (F1) has only the ring A, only the ring B and the ring C, and the ring A to the ring C among the ring A to the ring C, $—NR^7R^8$ may be introduced into either $R^4$ or $R^6$. When the compound (F1) has only the ring B, and only the ring A and the ring B, $—NR^7R^8$ is preferably introduced into $R^4$. Similarly, when the compound (F1) has only the ring C, and only the ring A and the ring C, $—NR^7R^8$ is preferably introduced into $R^6$.

As $—NR^7R^8$, $—NH—C(=O)—R^9$ is preferable from a point of view of solubility to the host solvent and the transparent resin. As $R^9$, the alkyl group having 1 to 20 carbon atoms which may have a substituent or the aryl group having 6 to 10 carbon atoms which may have a substituent are preferable. As the substituent, the fluorine atom, an alkyl group having 1 to 6 carbon atoms, a fluoroalkyl group having 1 to 6 carbon atoms, an alkoxy group having 1 to 6 carbon atoms, an acyloxy group having 1 to 6 carbon atoms, and so on can be used. Among them, a group selected from the alkyl group having 1 to 6 carbon atoms which may be substituted by the fluorine atom, and a phenyl group which may be substituted by the fluoroalkyl group having 1 to 6 carbon atoms and/or the alkoxy group having 1 to 6 carbon atoms.

At least any one of the ring A, the ring B, and the ring C which are respectively formed a 5-membered ring or a 6-membered ring by $R^1$ and $R^2$, $R^2$ and $R^5$, and $R^1$ and $R^3$ coupled with each other, may be formed in the compound (F1), and two or three of the ring A, the ring B, and the ring C may be formed.

$R^1$ and $R^2$ when the ring is not formed each independently represent the hydrogen atom, the alkyl group having 1 to 6 carbon atoms which may have a substituent, the allyl group, the aryl group or the alaryl group having 6 to 11 carbon atoms. As the substituent, a hydroxy group, the alkoxy group having 1 to 3 carbon atoms, and the acyloxy group can be used. $R^3$ and $R^5$ when the ring is not formed each independently represent the hydrogen atom, the halogen atom, or the alkyl group or the alkoxy group having 1 to 6 carbon atoms. Among them, the alkyl group having 1 to 3 carbon atoms is preferable, and the methyl group is particularly preferable as $R^1$, $R^2$, $R^3$, and $R^5$ from the point of view of solubility to the host solvent and the transparent resin.

Besides, in the compound (F1), the groups $R^1$ to $R^6$ bonded to the benzene rings which bonded to the right and left of the squarylium skeleton may be different at the right and left, but it is preferably the same at the right and left. Note that the compound (F1) includes a compound (F1-1) expressed by a formula (F1-1) having a resonance structure of the structure expressed by the general formula (F1).

[Chemical Formula 7]

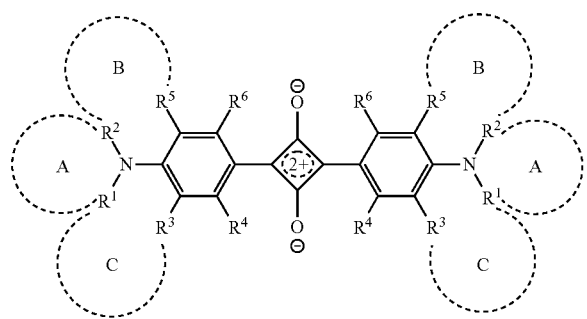

(F1-1)

Note that symbols in the formula (F1-1) are the same as the definitions in the formula (F1).

More specifically, a compound expressed by the following formula (F11) having only the ring B as the ring structure, a compound expressed by the following formula (F12) having only the ring A as the ring structure, and a compound expressed by the following formula (F13) having two rings of the ring B and the ring C as the ring structures can be used as the compound (F1). Note that the compound expressed by the formula (F11) is the same compound as the compound in which only the ring C is held as the ring structure and $R^6$ is —$NR^7R^8$ in the compound (F1). Besides, the compound expressed by the formula (F11) and the compound expressed by the formula (F13) are the compounds described in description of U.S. Patent Publication No. 5543086.

[Chemical Formula 8]

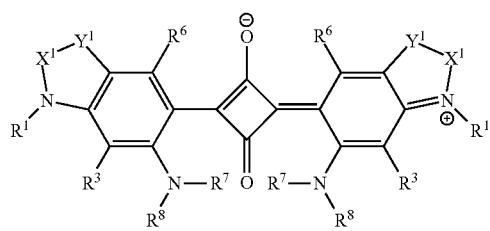

(F11)

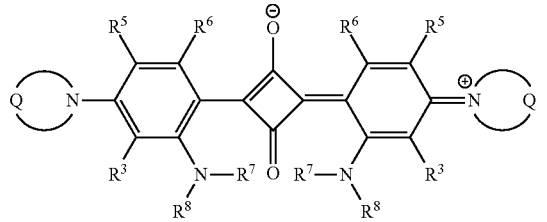

(F12)

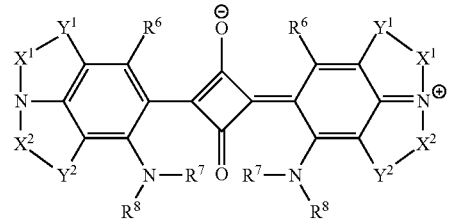

(F13)

Note that symbols in the formulas (F11) to (F13) are the same as the definitions in the formula (F1), and preferable examples are also the same.

In the compound (F11), an ethylene group in which the hydrogen atom may be substituted by the alkyl group having 1 to 6 carbon atoms or the aryl group having 6 to 10 carbon atoms expressed by the above-stated formula (2x) is preferable as $X^1$. In this case, the alkyl group having 1 to 3 carbon atoms is preferable, and the methyl group is more preferable as the substituent. Specifically, —$(CH_2)_2$—, —$CH_2$—$C(CH_3)_2$—, —$CH(CH_3)$—$C(CH_3)_2$—, —$C(CH_3)_2$—$C(CH_3)_2$—, and so on can be used as $X^1$. A single bond, —$CH_2$—, —$C(CH_3)_2$—, —$CH(C_6H_5)$—, —$CH((CH_2)_mCH_3)$— (where m is 0 to 5), and so on can be used as $Y^1$. As —$NR^7R^8$ in the compound (F11), —NH—$C(=O)$—$C_mH_{2m+1}$ (where m is 1 to 20, $C_mH_{2m+1}$ may be any of the straight chain state, the branched chain state, or the ring state), —NH—$C(=O)$-Ph-$R^{10}$ (where $R^{10}$ represents the hydrogen atom, the alkyl group having 1 to 3 carbon atoms, the alkoxy group having 1 to 3 carbon atoms, or a perfluoroalkyl group having 1 to 3 carbon atoms), and so on can be used, and —NH—$C(=O)$—$CH_3$, —NH—$C(=O)$—$C_6H_{13}$, —NH—$C(=O)$—$C_6H_5$, and so on are preferable. For example, a compound and so on expressed by the following formula (F11-1) can be used as the compound (F11).

[Chemical Formula 9]

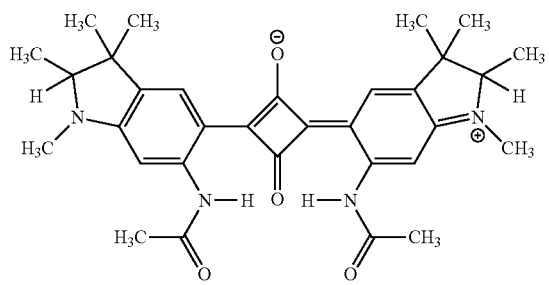

(F11-1)

In the compound (F12), Q is the alkylene group having 4 or 5 carbon atoms or the alkyleneoxy group having 3 or 4 carbon atoms, in which the hydrogen atom may be substituted by the alkyl group having 1 to 6 carbon atoms or the aryl group having 6 to 10 carbon atoms. A position of an oxygen atom when Q is the alkyleneoxy group is preferably other than next to N. Note that a butylene group which may be substituted by the alkyl group having 1 to 3 carbon atoms, particularly the methyl group, is preferable as Q. In the compound (F12), —NR$^7$R$^8$ is —NH—C(═O)—C$_m$H$_{2m+1}$ (where m is 1 to 20, C$_m$H$_{2m+1}$ may be any of the straight chain state, the branched chain state, or the ring state), —NH—C(═O)-Ph-R$^{10}$ (where R$^{10}$ represents the hydrogen atom, the alkyl group having 1 to 3 carbon atoms, the alkoxy group having 1 to 3 carbon atoms, or the perfluoroalkyl group having 1 to 3 carbon atoms) and so on are preferable.

Here, the compound (F12) is a preferable compound as the NIR absorbing dye (B1) in which the λmax of the compound (F12) exists between 700 nm and 720 nm, and it is possible to set the variation D of the transmittance at the near infrared absorbing layer which contains the compound (F12) at −0.86 or less. It becomes possible to widen a transmission region of the visible wavelength band by setting the λmax within the above-stated range. For example, a compound expressed by the following formula (F12-1), a compound expressed by the following formula (F12-2), and so on can be used as the compound (F12).

[Chemical Formula 10]

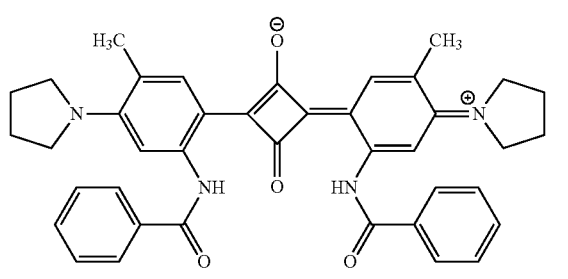

(F12-1)

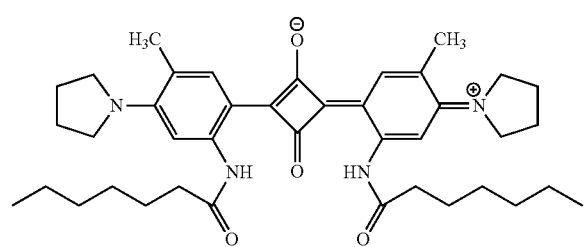

(F12-2)

In the compound (F13), the ethylene group whose hydrogen atom may be substituted by the alkyl group having 1 to 6 carbon atoms or the aryl group having 6 to 10 carbon atoms independently expressed by the formula (2x) is preferable as X$^1$ and X$^2$. In this case, the alkyl group having 1 to 3 carbon atoms is preferable, and the methyl group is more preferable as the substituent. Specifically, —(CH$_2$)$_2$—, —CH$_2$—C(CH$_3$)$_2$—, —CH(CH$_3$)—C(CH$_3$)$_2$—, —C(CH$_3$)$_2$—C(CH$_3$)$_2$—, and so on can be used as X$^1$ and X$^2$. A single bond, —CH$_2$—, —C(CH$_3$)$_2$—, —CH(C$_6$H$_5$)—, —CH((CH$_2$)$_m$CH$_3$)— (where m is 0 to 5), and so on can be independently used as Y$^1$ and Y$^2$. In the compound (F13), —NH—C(═O)—C$_m$H$_{2m+1}$ (where m is 1 to 20, C$_m$H$_{2m+1}$ may be any of the straight chain state, the branched chain state, or the ring state), —NH—C(═O)-Ph-R$^{10}$ (where R$^{10}$ represents the hydrogen atom, the alkyl group having 1 to 3 carbon atoms, the alkoxy group having 1 to 3 carbon atoms, or the perfluoroalkyl group having 1 to 3 carbon atoms) and so on are preferable as —NR$^7$R$^8$. For example, a compound expressed by the following formula (F13-1) and so on can be used as the compound (F13).

[Chemical Formula 11]

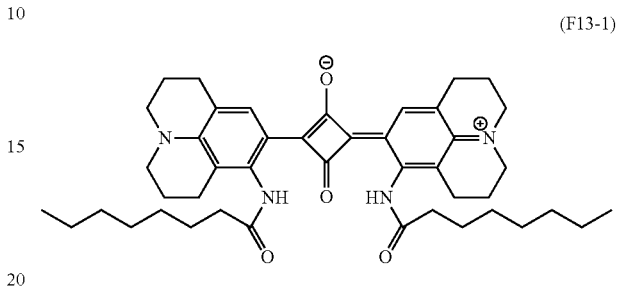

(F13-1)

Light absorption characteristics of the compound (F11-1), the compound (F12-1), the compound (F12-2), and the compound (F13-1) are illustrated in Table 1.

TABLE 1

| Compound Abbreviation | Structural Formula | Absorbance Measurement Solvent | λ max | Full Width at Half Maximum | Absorption Spectrum Slope |
|---|---|---|---|---|---|
| F11-1 | F11-1 | acetone | 695 | 35 | 0.0136 |
| F12-1 | F12-1 | dichloromethane | 704 | 34 | 0.0127 |
| F12-2 | F12-2 | dichloromethane | 700 | 35 | 0.0133 |
| F13-1 | F13-1 | dichloromethane | 704 | 35 | 0.0128 |

Note that the compounds (F1) such as the compound (F11), the compound (F12), and the compound (F13) can be manufactured by a conventional publicly known method. The compound (F11) such as the compound (F11-1) can be manufactured by, for example, a method described in the description of U.S. Patent Publication No. 5543086. Besides, the compound (F12) can be manufactured by, for example, a method described in J. Org. Chem. 2005, 70(13), 5164-5173.

Among them, the compound (F12-1), the compound (F12-2) and so on can be manufactured in accordance with a synthetic pathway expressed by, for example, the following reaction formula (F3). According to the reaction formula (F3), an amide is formed by reacting a carboxylic acid chloride having a predetermined substituent R$^9$ (for example, the phenyl group (hereinafter, represented by "-Ph") incase of the compound (F12-1), —(CH$_2$)$_5$—CH$_3$ in case of the compound (F12-2)) with an amino group of 1-methyl-2-iodine-4-aminobenzene. Next, the obtained amide is reacted with pyrrolidine, and further reacted with 3,4-dihydroxy-3-cyclobutene-1,2-dione (hereinafter, referred to as a squaric acid), and thereby, the compound (F12-1), the compound (F12-2), and so on can be obtained.

[Chemical Formula 12] (F3)

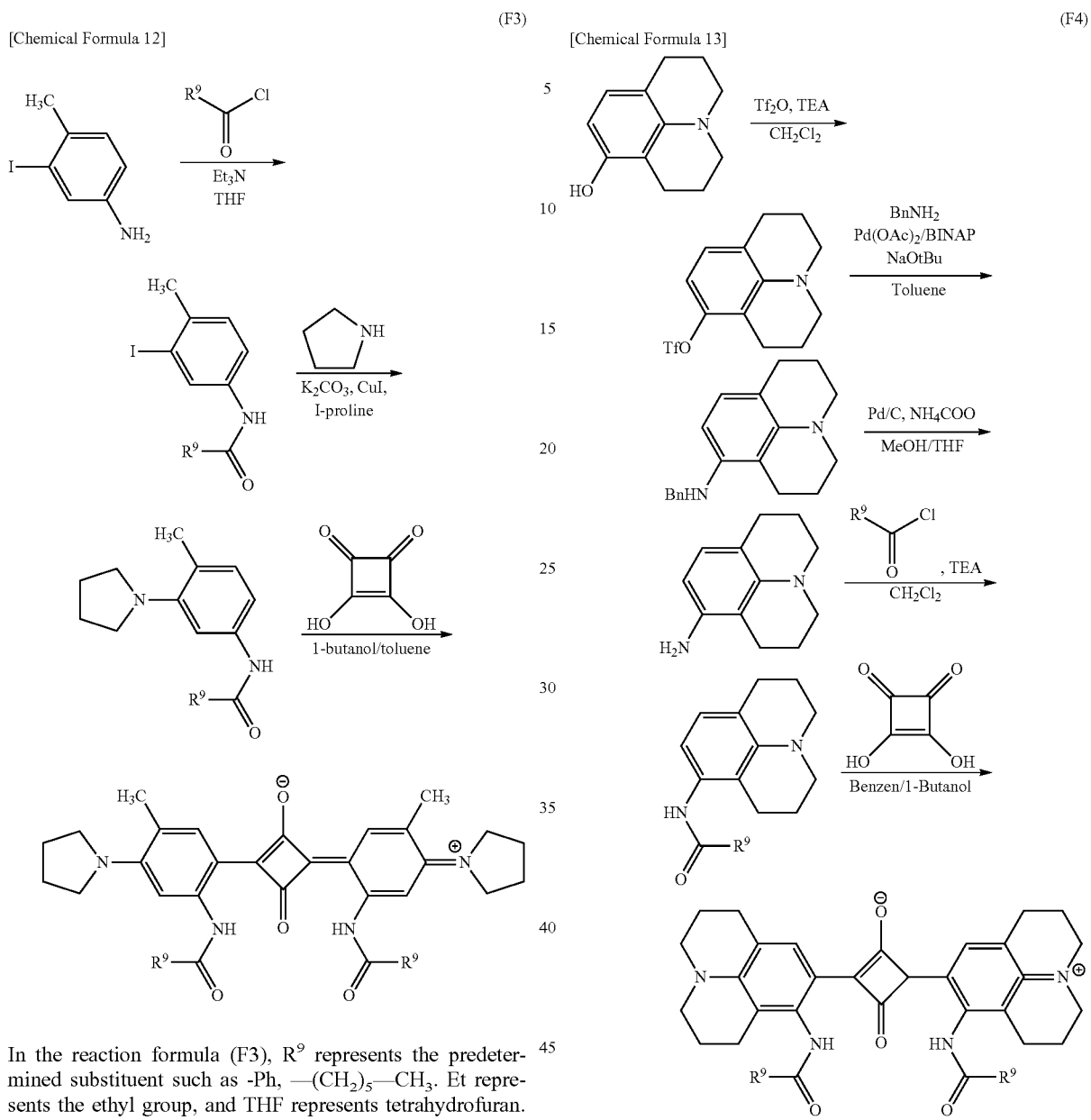

[Chemical Formula 13] (F4)

In the reaction formula (F3), $R^9$ represents the predetermined substituent such as -Ph, —$(CH_2)_5$—$CH_3$. Et represents the ethyl group, and THF represents tetrahydrofuran.

Besides, the compound (F13-1) and so on can be manufactured in accordance with a synthetic pathway expressed by, for example, the following reaction formula (F4). In the reaction formula (F4), at first, trifluoromethanesulfonic acid anhydride ($Tf_2O$) is reacted with 8-hydroxyjulolidine to make 8-julolidine trifluoromethanesulfonate, next benzylamine is reacted thereto to obtain 8-benzylamino julolidine, further this is reduced to manufacture 8-aminojulolidine. Next, a compound having —NH—C(=O)$R^9$ at an 8-position of julolidine is obtained by reacting the carboxylic acid chloride having the predetermined substituent $R^9$ (for example, —$(CH_2)_6$—$CH_3$ in case of the compound (F13-1)) with the amino group of 8-aminojulolidine. Next, two moles of this compound is reacted with one mole of squaric acid to thereby obtain the compound (F13-1) and so on.

In the reaction formula (F4), $R^9$ represents the predetermined substituent, Me represents the methyl group, TEA represents triethylamine, Ac represents an acetyl group, BINAP represents (2,2'-bis(diphenylphosphino)-1,1'-binaphthyl), and NaOtBu represents sodium t-butoxide, respectively.

In the present embodiment, one kind selected from the plural compounds having the light absorption characteristics as the NIR absorbing dye (B1) may be independently used, and two or more kinds may be used together as the NIR absorbing dye (B1).

In the embodiments, particularly, it is preferable to use the transparent resin whose refractive index is 1.54 or more, the refractive index of the used transparent resin is more preferably 1.55 or more, and 1.56 or more is particularly preferable as the transparent resin when the NIR absorbing dye (B1) is used as the NIR absorbing dye. The NIR absorbing dye (B1) is dispersed to be used in the transparent resin whose refractive index is 1.54 or more, and thereby, it becomes possible for an obtained resin layer containing the NIR absorbing dye (B1), namely, the near infrared absorbing layer to widen a shielding region from the wavelength at the maximum absorption in the absorption spectrum of the NIR absorbing dye (B1) to a long wavelength region while maintaining the optical characteristics in which the absorption curve steeply changes between the wavelengths of 630 nm and 700 nm which is important as a near infrared absorption filter for an imaging device.

Here, in the near infrared absorption filter of the present embodiment, it is preferable to suppress the transmittance at the near infrared wavelength region for a wide range, and therefore, there is a case when the near infrared absorbing layer and, for example, a selected wavelength shielding layer consisting of a dielectric multilayered film in which low refractive index dielectric films and high refractive index dielectric films are alternately stacked are combined to be used.

Incidentally, the selected wavelength shielding layer consisting of the dielectric multilayered film and so on is known that a spectrum varies depending on a sight line angle. Accordingly, it is necessary to take the variation of the spectrum as stated above into consideration in the combination of the near infrared absorbing layer and the selected wavelength shielding layer when the near infrared absorption filter is actually used. When the combination with the selected wavelength shielding layer is considered, it is preferable that the near infrared absorbing layer shields the light in further longer wavelength region as long as the near infrared absorbing layer has the above-stated light absorption characteristics.

Accordingly, when the NIR absorbing dye contains the NIR absorbing dye (B1), it is preferable to further contain an NIR absorbing dye (B2) which has a wavelength at maximum absorption in the near infrared wavelength region exceeding 720 nm being the maximum value of the λmax of the NIR absorbing dye (B1), and has a maximum absorption peak which does not affect on the effect to make the light absorption curve at the boundary area between the visible light wavelength band and the near infrared wavelength band held by the NIR absorbing dye (B1) steep. From a viewpoint as stated above, a cyanine-based compound to which the light absorption characteristics required as the NIR absorbing dye (B2) is added by adjusting a chemical structure thereof is preferable as the NIR absorbing dye (B2). The cyanine-based compound is a dye used as a recording dye such as a CD-R for a long time, it is known to be low-cost, and stability for a long time can be secured by a salt formation.

A content of the NIR absorbing dye in the composition for forming the near infrared absorbing layer is preferably a ratio of 0.2 parts by mass to 10 parts by mass, and more preferably a ratio of 0.5 parts by mass to 5 parts by mass relative to 100 parts by mass of the transparent resin. When the NIR absorbing dye (B1) is used as the NIR absorbing dye, the ratio of the NIR absorbing dye (B1) relative to a whole quantity of the NIR absorbing dye is preferably 10 mass % to 100 mass %, and particularly preferably 30 mass % to 100 mass %. It is possible to maintain enough near infrared absorption characteristics when the content of the NIR absorbing dye is 0.2 parts by mass or more relative to 100 parts by mass of the transparent resin. It is possible to maintain the enough near infrared absorption characteristics without reducing the transmittance at the visible wavelength region when it is 10 parts by mass or less.

(3) Silane Coupling Agent and/or Oligomer Thereof

The silane coupling agent and/or oligomer thereof contained by the composition for forming the near infrared absorbing layer is a silane coupling agent and/or oligomer thereof having the hydrolysable group and the functional group which have reactivity for the reactivity group of the transparent resin. And it is possible to be used for the silane coupling agent and/or oligomer thereof without any limitation as long as the optical characteristics of the NIR absorbing dye containing in the composition for forming the near infrared absorbing layer are not disturbed. Hereinafter, the silane coupling agent having the hydrolyzable group and the functional group which have reactivity for the reactivity group of the transparent resin is referred to as a silane coupling agent (C).

As the reactivity group of the transparent resin, reactivity groups relating to reactions such as polymerization of each raw material component used when the transparent resin is manufactured can be cited. Accordingly, the silane coupling agent (C) to be used is selected as a combination with the transparent resin.

There is a case when the transparent resin contains at least one kind of the thermoplastic resin (A1), and further contains the thermoplastic resin (A2) other than the thermoplastic resin (A1). When the transparent resin consists of two kinds or more of the thermoplastic resins containing at least one kind of the thermoplastic resin (A1), the silane coupling agent (C) to be used may be one having the functional group which has reactivity for the reactivity group of any of the thermoplastic resins. It is preferable to use the silane coupling agent (C) having the functional group which has the reactivity for the reactivity group of the thermoplastic resin whose ratio occupying on the transparent resin is the largest. In this case, the silane coupling agent (C) having the functional group which has reactivity for the reactivity group of the thermoplastic resin whose ratio occupying on the transparent resin is small may be additionally used.

A compound expressed by the following general formula (S1) can be preferably used as the silane coupling agent (C) as stated above. Hereinafter, there is a case when the compound expressed by the formula (S1) is referred to as a compound (S1).

$$R^{11}SiR^{12}{}_n X^{11}{}_{3-n} \qquad (S1)$$

(In the formula (S1), $R^{11}$ represents a monovalent organic group having 1 to 10 carbon atoms and having the functional group which has the reactivity with the reactivity group of the transparent resin at a terminal, $R^{12}$ represents a monovalent hydrocarbon group having 1 to 6 carbon atoms, "n" represents an integer number of 0 or 1, $X^{11}$ is the hydrolyzable group which may be the same or different, respectively.)

Here, as the functional group of $R^{11}$ at the terminal, specifically, for example, the amino group, the epoxy group, the acryloxy group, the methacryloxy group, a vinyl group, a mercapto group, an isocyanate group, an ureido group, the chlorine atom, and so on can be used though it depends on the reactivity group of the transparent resin. Note that when the terminal is the chlorine atom, it is treated as the functional group in a form of —$CH_2Cl$.

For example, when the reactivity group of the transparent resin is ethylenic double bond, the vinyl group, the (metha)acryloxy group, and so on can be used as the functional group. When the reactivity group of the transparent resin is the carboxyl group, the amino group, the epoxy group, and so on can be used as the functional group, and when the reactivity group is the hydroxyl group, the isocyanate group, the epoxy group, the amino group, and so on can be used as the functional group.

In the formula (S1), $R^{12}$ is the monovalent hydrocarbon group having 1 to 6 carbon atoms, and preferably having 1 to 4 carbon atoms. $R^{12}$ is more preferably the methyl group or the ethyl group, and is particularly preferably the methyl group.

$X^{11}$ is the hydrolyzable group, and specifically, the chlorine atom, the alkoxy group having 1 to 5 carbon atoms, an acyl group, the amino group can be used. Among them, the alkoxy group having 1 to 4 carbon atoms is preferable, and a methoxy group, an ethoxy group are particularly preferable. The number of hydrolyzable groups bonded to a silicon atom is two or three, and the two or three hydrolyzable groups may be the same or different, but it is preferably the same from a point of view of productivity.

In the formula (S1), the number of carbon atoms of $R^{11}$ is the number of carbon atoms including the number of carbon atoms of a terminal group, and a preferable number of carbon atoms is different depending on the terminal group. When the terminal is the vinyl group, the preferable number of carbon atoms is 2 to 4, and 2 is more preferable. When the terminal is the epoxy group, a glycidyloxy group, an epoxycyclohexyl group are preferable as the terminal group containing the epoxy group, and a structure having the alkylene group having 1 to 6 carbon atoms is preferable as a linking group bonding the terminal group and the silicon atom. An ethylene group and a propylene group are particularly preferable as the linking group. When $R^{11}$ has the terminal group other than the vinyl group and the epoxy group, a structure having the alkylene group having 1 to 10 carbon atoms is preferable as the linking group bonding the terminal group and the silicon atom, and the ethylene group, the propylene group are particularly preferable as the linking group. When $R^{11}$ has the chlorine atom at the terminal, a chlorine atom number is preferably "1", and a 2-chloroethyl group and a 3-chloropropyl group are preferable as $R^{11}$.

The silane coupling agent (C), for example, the compound (S1) has a hydrolyzable silyl group. The hydrolyzable silyl group becomes a silanol group by hydrolysis under existence of moisture. The silanol group generates a siloxane bond expressed by —Si—O—Si— by dehydrating and condensing between molecules, and forms a chemical bond (glass substrate-O—Si) by performing dehydration/condensation reaction with the hydroxyl group at a surface of the glass substrate (glass substrate-OH) in a vicinity of the glass substrate. Besides, the functional group of the silane coupling agent (C) reacts with the reactivity group of the transparent resin, and thereby, the chemical bond with the transparent resin is obtained. In the embodiments, the firm adhesiveness between the glass substrate 1 and the near infrared absorbing layer 2 is enabled by the chemical bonds between the glass substrate and the transparent resin via the silane coupling agent (C).

Besides, the silane coupling agent (C) is contained in the composition for forming the near infrared absorbing layer together with the transparent resin as the layer forming component, the near infrared absorbing layer is formed by using the above, and thereby, the silane coupling agent (C) partially forms a silicon dioxide matrix by the siloxane bond similar to the above in the obtained near infrared absorbing layer 2, and further, it is conceivable that a bond between the silicon dioxide matrix and the transparent resin is obtained by the functional group. Further, when a later-described dielectric multilayered film is formed on a surface of the near infrared absorbing layer 2 at an opposite side of the glass substrate 1, it is expectable that the chemical bond (metal oxide layer-O—Si) is formed at the surface thereof similar to the case of the glass substrate, a similar mechanism as the adhesiveness with the glass substrate is thereby formed, and the fine adhesiveness is exhibited between the near infrared absorbing layer and the dielectric multilayered film by forming the near infrared absorbing layer while making the composition for forming the near infrared absorbing layer contain the silane coupling agent (C), because the dielectric multilayered film generally consists of a metal oxide.

As the above-stated silane-based coupling agent (C), for example, epoxysilanes such as 2-(3,4-epoxycyclohexyl)ethyltrimethoxysilane, 3-glycidoxypropyltrimethoxysilane, 3-glycidoxypropyltriethoxysilane, 3-glycidoxypropylmethyldiethoxysilane, (metha)acryloxysilanes such as 3-methacryloxypropylmethyldimethoxysilane, 3-methacryloxypropyltrimethoxysilane, 3-acryloxypropyltrimethoxysilane, vinylsilanes such as vinyltrimethoxysilane, N-2-(N-vinylbenzylaminoethyl)-3-aminopropyltrimethoxysilane, aminosilanes such as N-(2-aminoethyl)-3-aminopropylmethyldimethoxysilane, N-(2-aminoethyl)-3-aminopropyltrimethoxysilane, N-(2-aminoethyl)-N'-(2-aminoethyl)-3-aminopropyltriethoxysilane, 3-aminopropyltrimethoxysilane, 3-aminopropylmethyldimethoxysilane, N-phenyl-3-aminopropyltrimethoxysilane, isocyanatesilanes such as 3-isocyanatepropyltrimethoxysilane, 3-ureidopropyltriethoxysilane, 3-mercaptopropyltrimethoxysilane, 3-chloropropyltrimethoxysilane, and so on can be used.

Note that specifically, as the combination of the kinds of the thermoplastic resin constituting the transparent resin and the silane-based coupling agent (C), (metha)acryloxysilanes, vinylsilanes, epoxysilanes, aminosilanes and isocyanatesilanes can be used when the thermoplastic resin is the acrylic resin. Epoxysilanes and aminosilanes can be used when the thermoplastic resin is the polycarbonate resin. Epoxysilanes, aminosilanes and isocyanatesilanes can be used when the thermoplastic resin is the polyester resin.

Here, an essential requirement of the silane coupling agent (C) is not to disturb the optical characteristics of the NIR absorbing dye contained in the near infrared absorbing layer 2. For example, when the NIR absorbing dye (B1) expressed by the formula (F1) which is preferably used in the embodiments is used as the NIR absorbing dye, epoxysilanes, (metha) acryloxysilanes are preferable, and the epoxysilanes are particularly preferable as the silane coupling agent (C), though it depends on the NIR absorbing dye to be used. As the silane coupling agent (C), one kind may be independently used, or two or more kinds may be combined to be used.

Note that when the silane coupling agent (C) such as the compound (S1) is blended to the composition for forming the near infrared absorbing layer, the silane coupling agent (C) may be blended in a state as it is, or it may be blended as oligomer (partially hydrolysis condensate) thereof. Besides, it may be blended to the composition for forming the near infrared absorbing layer as a mixture of the silane coupling agent (C) and oligomer thereof.

Besides, when the two or more kinds of silane coupling agents (C) are combined to be used, each compound may be blended to the composition for forming the near infrared absorbing layer in a state as it is, each may be blended as oligomer, further may be blended as co-oligomer (partially hydrolysis co-condensate) of the two or more kinds of compounds. Besides, it may be a mixture of the compound, oligomer (partially hydrolysis condensate), and co-oligomer (partially hydrolysis co-condensate). Hereinafter, the "silane coupling agents (C)" is used as a term including the oligomer and the co-oligomer in addition to the silane coupling agent (C) in itself.

Oligomer and co-oligomer of the silane coupling agent (C) are a multimer generated by a part or all of the hydrolyzable silyl group of the silane coupling agent (C) is hydrolyzed, then dehydrated and condensed under existence of catalyst such as an acid catalyst, an alkaline catalyst in a solvent. Oligomer and co-oligomer of the silane coupling agent (C) are also having the hydrolyzable group (including the silanol group) and the functional group which have reactivity for the reactivity group of the transparent resin. Note that a degree of condensation (degree of multimerization) of this multimer is a degree in which a product is dissolved in a solvent.

A content of the silane coupling agents (C) in the composition for forming the near infrared absorbing layer is preferably a ratio of 0.1 parts by mass to 30 parts by mass relative to 100 parts by mass of the transparent resin, more preferably 0.5 parts by mass to 15 parts by mass, and particularly preferably 3 parts by mass to 15 parts by mass. When a blending amount of the silane coupling agents (C) is within the above-stated range, it is possible to maintain the enough adhesiveness between the glass substrate 1 and the near infrared absorbing layer 2, and to maintain the enough near infrared absorbing characteristics without reducing the transmittance in the visible light region.

(Composition for Forming the Near Infrared Absorbing Layer)

The composition for forming the near infrared absorbing layer used in the embodiments of the present invention contains the transparent resin, the NIR absorbing dye, and the silane coupling agents (C) being the above-stated essential components. Contents of respective essential components are as stated above. The composition for forming the near infrared absorbing layer generally contains a solvent. The solvent has a function to form the near infrared absorbing layer on the glass substrate as a uniform layer, and it is a component removed during the formation process of the near infrared absorbing layer. The composition for forming the near infrared absorbing layer may further contain arbitrary components having various kinds of functions according to needs within a range not disturbing the effects of the embodiments of the present invention.

As the above-stated arbitrary components, a near infrared to infrared light absorber other than the NIR absorbing dye consisting of inorganic particles, a color tone correcting dye, an ultraviolet light absorber, a leveling agent, an antistatic agent, a heat stabilizer, a light stabilizer, an antioxidant, a dispersing agent, a flame retardant, a lubricant, a plasticizer, and so on can be used. It is preferable to blend each of these arbitrary components at an amount of 10 parts by mass or less relative to 100 parts by mass of the transparent resin in the composition for forming the near infrared absorbing layer.

Besides, as the near infrared to infrared light absorbent (inorganic particles), particles consisting of ITO (Indium Tin Oxides), ATO (Antimony-doped Tin Oxides), lanthanum boride, and so on can be used. Among them, ITO particles is particularly preferable when a shielding property of light in an infrared wavelength region is required because the transmittance of light in the visible wavelength region is high, and it has light absorbability in a wide range including the infrared wavelength region exceeding 1200 nm.

A number average aggregate particle size of the ITO particles is preferably 5 nm to 200 nm, more preferably 5 nm to 100 nm, and further preferably 5 nm to 70 nm from points of view of suppressing scattering, and maintaining transparency. Here, in this specification, the number average aggregate particle size is a value measured by using a dynamic light scattering particle size distribution analyzer as for a dispersion liquid for measuring particle size in which sample particles are dispersed in a dispersion medium such as water and/or alcohol.

The near infrared to infrared light absorber (inorganic particles) can be blended at a ratio of preferably 0.1 parts by mass to 10 parts by mass, more preferably 0.3 parts by mass to 10 parts by mass relative to 100 parts by mass of the transparent resin as a range of amount in which the near infrared to infrared light absorber (inorganic particles) is able to exhibit the function thereof while securing the other properties required for the near infrared absorbing layer.

As the ultraviolet light absorber, a benzotriazol-based ultraviolet light absorber, a benzophenone-based ultraviolet light absorber, a salicylate-based ultraviolet light absorber, a cyanoacrylate-based ultraviolet light absorber, a triazine-based ultraviolet light absorber, an okizanirido-based ultraviolet light absorber, a nickel complex salt-based ultraviolet light absorber, an inorganic-based ultraviolet light absorber, and so on are preferably used. As a commercial item, a brand name of "TINUYIN 479", manufactured by Ciba Co., Ltd. and so on can be used.

As the inorganic-based ultraviolet light absorber, for example, particles such as zinc oxide, titanium oxide, cerium oxide, zirconium oxide, mica, kaoline, sericite, and so on can be used. A number average aggregate particle size of the inorganic-based ultraviolet light absorber is preferably 5 nm to 200 nm, more preferably 5 nm to 100 nm, and further preferably 5 nm to 70 nm from a point of view of transparency. The ultraviolet light absorber can be blended at a ratio of preferably 0.01 parts by mass to 10 parts by mass, more preferably 0.05 parts by mass to 5 parts by mass relative to 100 parts by mass of the transparent resin as a range of amount in which the ultraviolet light absorber is able to exhibit the function thereof while securing the other properties required for the near infrared absorbing layer.

As the light stabilizer, hindered amines, nickel complexes such as nickelbis(octylphenyl)sulfide, nickel complex-3,5-di-tert-butyl-4-hydroxybenzyl phosphate monoethylate, nickel dibutyldithiocarbamate can be used. One kind of the light stabilizer may be independently used, or two or more kinds of them may be used together. A content of the light stabilizer in the composition for forming the near infrared absorbing layer is preferably 0.01 parts by mass to 10 parts by mass, and particularly preferably 0.5 parts by mass to 5 parts by mass relative to 100 parts by mass of the transparent resin.

As the solvent contained in the composition for forming the near infrared absorbing layer, it is not particularly limited as long as it is a solvent capable of stably dispersing and dissolving the above-described transparent resin, NIR absorbing dye, and silane coupling agents (C). Specifically, ketones such as acetone, methyl ethyl ketone, methyl isobutyl ketone, cyclohexanone; ethers such as tetrahydrofuran, 1,4-dioxane, 1,2-dimethoxyethane; esters such as ethyl acetate, butyl acetate, methoxyethyl acetate; alcohols such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol, diacetone alcohol; hydrocarbons such as n-hexane, n-heptane, isooctane, benzene, toluene, xylene, gasoline, light oil, kerosene; acetonitrile, nitromethane, water, and so on can be used. One kind of these may be independently used, or two or more kinds of these may be used together.

An amount of the solvent is preferably 100 parts by mass to 10000 parts by mass, and particularly preferably 200 parts by mass to 5000 parts by mass relative to 100 parts by mass of the transparent resin. Note that a content of a nonvolatile component (solid content) in the composition for forming the near infrared absorbing layer is preferably 10 mass % to 50 mass %, and particularly preferably 5 mass to 40 mass relative to a whole amount of the composition for forming the near infrared absorbing layer.

Stirrers such as a magnetic stirrer, a planetary centrifugal mixer, a bead mill, a satellite mill, an ultrasonic homogenizer can be used for preparing the composition for forming the near infrared absorbing layer. It is preferable to perform enough stirring so as to secure high transparency. The stirring may be performed continuously or intermittently.

(Formation of Near Infrared Absorbing Layer)

The formation of the near infrared absorbing layer 2 on the glass substrate 1 is able to be performed by using the composition for forming the near infrared absorbing layer, and, for example, by coating a proper amount of the composition for forming the near infrared absorbing layer on the glass substrate 1, appropriately removing the solvent, and thereafter, making a reaction component in the composition for forming the near infrared absorbing layer react.

For the coating of the composition for forming the near infrared absorbing layer, coating methods such as an immersion coating method, a cast coating method, a spray coating method, a spinner coating method, a beat coating method, a wire bar coating method, a blade coating method, a roller coating method, a curtain coating method, a slit die coater method, a gravure coater method, a slit reverse coater method, a micro gravure method, or a comma coater method can be used. In addition, a bar coater method, a screen printing method, a flexo printing method, and so on can be used.

After the composition for forming the near infrared absorbing layer is coated on the glass substrate 1, the solvent is removed by drying, further the hydrolysis and condensation reaction relating to the silane coupling agents (C) is performed, and thereby, the near infrared absorbing layer 2 is able to be formed on the glass substrate 1 with enough adhesiveness. As a condition of the drying, it is preferably 80° C. to 150° C. for approximately 5 minutes to 60 minutes. Besides, as a condition of the hydrolysis and condensation reaction, it is preferably 100° C. to 200° C. for approximately 5 minutes to 60 minutes. Note that the drying and the hydrolysis and condensation reaction relating to the silane coupling agents (C) may be simultaneously performed. As conditions of the drying and the hydrolysis and condensation reaction at that time are preferably 90° C. to 200° C. for approximately 5 minutes to 60 minutes.

In the present embodiment, a thickness of the near infrared absorbing layer 2 is not particularly limited, but it may be appropriately defined in accordance with uses thereof, namely, a disposition space in a device to be used, required absorption characteristics, and so on. It is preferably within a range of 0.5 μm to 100 μm, and more preferably within a range of 1 μm to 50 μm. It is possible to enable both the enough near infrared absorption ability, and uniformity of the thickness and flatness of the surface by setting the thickness within the above-stated range. When the thickness is 0.5 μm or more, the near infrared absorption ability can be enough exhibited. When the thickness is 100 μm or less, the uniformity of the thickness and the flatness of the surface are easy to obtain, and it is possible to make it difficult to generate variation of absorptance. When the thickness is 50 μm or less, it becomes further advantageous for downsizing of the device.

In the near infrared absorbing layer 2, it is preferable that the transmittance of the visible light wavelength region of 450 nm to 600 nm is 70% or more, the transmittance of light in the wavelength region of 695 nm to 720 nm is 10% or less, and the variation D of the transmittance is −0.8 or less. Note that the transmittance of the near infrared absorbing layer can be measured by using an ultraviolet-visible spectrophotometer. Besides, the near infrared absorption characteristics of the near infrared absorbing layer as stated above can be achieved by using, for example, the NIR absorbing dye (B1) as the NIR absorbing dye.

Figure 2:
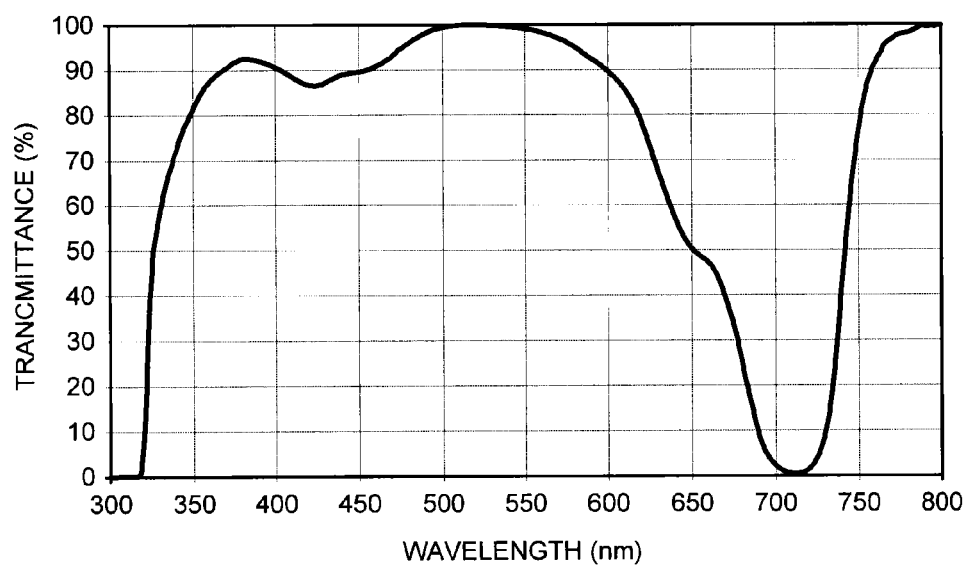
FIG. 2 is a view illustrating an example of a transmission spectrum of a near infrared absorbing layer of the embodiment of the optical filter according to the present invention.

When the transmittance in the visible light wavelength region of 450 nm to 600 nm is 70% or more, preferably 80% or more, and the transmittance of light in the wavelength region of 695 nm to 720 nm is 10% or less, preferably 5% or less, it is useful for the uses as the optical filter. Besides, when the variation D of the transmittance is −0.5 or less, preferably −0.8 or less, the change of the transmittance between the wavelengths of 630 nm to 700 nm becomes enough steep, and it is suitable for the optical filter usages of, for example, a digital still camera, a digital video, and so on. When the variation D of the transmittance is −0.5 or less, preferably −0.8 or less, use efficiency of the light in the visible wavelength region further improves while shielding the light in the near infrared wavelength region, and it becomes advantageous in a point of a noise suppression in shadow imaging. Note that an example of transmission spectrum of the near infrared absorbing layer (when the NIR absorbing dye (B1) is used as the NIR absorbing dye) according to the embodiment of the optical filter of the present invention is illustrated in FIG. 2.

In the optical filter 10A of the present embodiment, the transparent resin having the fluorene skeleton and the reactivity group, preferably the transparent resin containing the thermoplastic resin (A1) is contained as the layer forming component, further when the near infrared absorbing layer is formed by using the composition for forming the near infrared absorbing layer containing the NIR absorbing dye, the silane coupling agents (C) having the hydrolyzable group and the functional group which have the reactivity for the reactivity group of the transparent resin is blended to the composition to be used, and thereby, it is enabled to add the high adhesiveness between the glass substrate 1 and the near infrared absorbing layer 2 while enough securing the optical characteristics and operability. It is thereby possible to enable the high reliability in the optical filter 10A.

Further, the near infrared absorbing layer 2 according to the optical filter 10A of the present embodiment has a characteristic in which the transmittance of light in the visible wavelength region is high owing to the optical characteristics thereof, and the transmittance steeply changes between the wavelengths of 630 nm and 700 nm when the NIR absorbing dye (B1) is used as the contained NIR absorbing dye. Further, the refractive index of the transparent resin to be combined therewith is adjusted to be 1.54 or more, and thereby, the near infrared absorbing layer 2 has a characteristic in which the shielding wavelength region is wide such as 695 nm to 720 nm owing to the operation thereof. The embodiments of the present invention enables to form the near infrared absorbing layer 2 excellent in the optical characteristics as stated above on the glass substrate 1 without damaging the optical characteristics thereof and with firm adhesiveness. It is thereby possible to obtain the optical filter in which the light absorption characteristics of the NIR absorbing dye, especially of the NIR absorbing dye (B1) is efficiently used and having high reliability by using the near infrared absorbing layer 2 independently or by combining to be used with the other selected wavelength shielding layer, and so on as described later.

Besides, the near infrared absorbing characteristics are enabled by using the absorption of the infrared light by the NIR absorbing dye, especially by the NIR absorbing dye (B1), and therefore, a problem of an incident angle dependence of a spectral transmittance such as a reflection-type filter does not occur.

Further, the near infrared absorbing layer 2 according to the optical filter 10A of the present embodiment is able to be manufactured by coating the composition for forming the near infrared absorbing layer prepared by dispersing and dissolving the transparent resin, the NIR absorbing dye, and the silane coupling agents (C) in the solvent on the substrate, drying according to need, further performing the hydrolysis and condensation reaction relating to the silane coupling agents (C). Accordingly, it is possible to easily and fully enable the downsizing and reduction in thickness of the high reliability optical filter.

The optical filter according to the embodiments of the present invention includes the glass substrate and the above-described near infrared absorbing layer which is formed on one principal surface of the glass substrate. The constitution of the optical filter is not particularly limited except that the glass substrate and the near infrared absorbing layer are included. The optical filter may be made up only by the glass substrate 1 and the near infrared absorbing layer 2 as the optical filter 10A illustrated in FIG. 1, or the optical filter may be made up with the other components. As the other components, a reflection film reflecting light in a specific wavelength region, an anti-reflection film, the selected wavelength shielding layer controlling the transmission and shielding of light in a specific wavelength region, and so on can be used. When the optical filter according to the embodiments of the present invention has these various kinds of functional films, it is preferable that these are constituted by a dielectric multilayered film.

Figure 3:
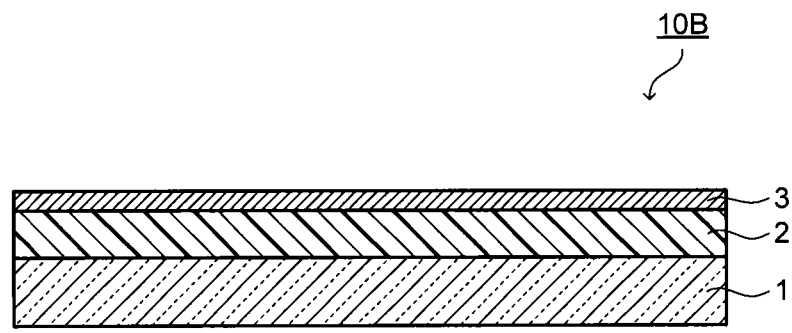
FIG. 3 is a sectional view schematically illustrating another example of the embodiment of the optical filter according to the present invention.

FIG. 3 is a sectional view schematically illustrating another example of the embodiment of the optical filter according to the present invention. An optical filter 10B according to the embodiment of the present invention illustrated in FIG. 3 is made up of the glass substrate 1, the near infrared absorbing layer 2 formed on one principal surface thereof, and a dielectric multilayered film 3 formed on a surface of the near infrared absorbing layer 2 at an opposite side of the glass substrate 1. The glass substrate 1 and the near infrared absorbing layer 2 can be made as same as the optical filter 10A.

The dielectric multilayered film 3 is a film having optical functions obtained by alternately stacking low refractive index dielectric films and high refractive index dielectric films. It is possible to use as the anti-reflection film, the reflection film, the selected wavelength shielding layer, and so on in which the function controlling the transmission and the shielding of the light in a specific wavelength region are exhibited by using interference of light according to a design thereof. It is preferable that the dielectric multilayered film 3 is designed as a film having the anti-reflection function in the optical filter 10B. When the dielectric multilayered film 3 is the anti-reflection film, the dielectric multilayered film (anti-reflection film) 3 improves the transmittance by preventing the reflection of light incident on the optical filter 10B, has a function to effectively use the incident light, and can be formed by conventionally known materials and methods.

As high refractive index materials constituting the high refractive index dielectric film, they are not particularly limited as long as the refractive index thereof is higher than low refractive index materials which are combined therewith to be used. Specifically, materials whose refractive indexes exceed 1.6 are preferable. More specifically, $Ta_2O_5$ (2.22), $TiO_2$ (2.41), $Nb_2O_5$ (2.3), $ZrO_2$ (1.99), and so on can be used. Among these, $TiO_2$ and so on are preferably used in the embodiments of the present invention as a result of comprehensive judgment of a film forming capability, the refractive index, and so on together with reproducibility and stability thereof. Note that a numeral in parentheses after each compound represents the refractive index. Hereinafter, the numeral in the parentheses after each compound similarly represents the refractive index also as for the low refractive index materials.

As the low refractive index materials constituting the low refractive index dielectric film, they are not particularly limited as long as the refractive index thereof is lower than the high refractive index materials which are combined therewith to be used. Specifically, a material whose refractive index is less than 1.55 is preferable. More specifically, $Si_2O_5$ (1.46), $SiO_xN_y$ (1.46 or more and less than 1.55), $MgF_2$ (1.38), and so on can be used. Among these, $SiO_2$ is preferable in points such as the reproducibility, stability, economic efficiency in the film forming capability, in the embodiments of the present invention.

A method to design the dielectric multilayered film 3 in which the high refractive index dielectric films and the low refractive index dielectric films are alternately stacked to be the anti-refraction film may be according to a conventional method. A typical example is illustrated in Table 2, but the design when the dielectric multilayered film 3 used in the embodiments of the present invention is made to be the anti-reflection film is not limited thereto.

TABLE 2

| | Material | Physical Film Thickness (nm) |
|---|---|---|
| 1st Layer | $TiO_2$ | 11.53 |
| 2nd Layer | $SiO_2$ | 44.26 |
| 3rd Layer | $TiO_2$ | 36.7 |
| 4th Layer | $SiO_2$ | 26.63 |
| 5th Layer | $TiO_2$ | 344.43 |
| 6th Layer | $SiO_2$ | 100.55 |

Figure 4:
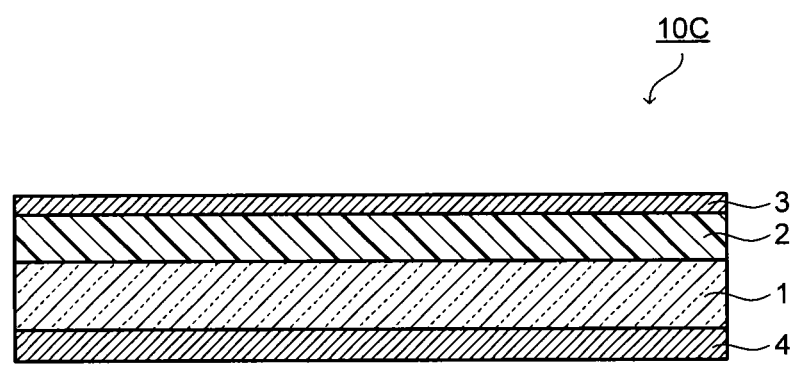
FIG. 4 is a sectional view schematically illustrating still another example of the embodiment of the optical filter according to the present invention.

FIG. 4 is a sectional view schematically illustrating still another example of the embodiment of the optical filter according to the present invention. An optical filter 10C according to the embodiment of the present invention illustrated in FIG. 4 is made up of the glass substrate 1, the near infrared absorbing layer 2 formed on one principal surface thereof, a first dielectric multilayered film 3 formed on a surface of the near infrared absorbing layer 2 at the opposite side of the glass substrate 1, and a second dielectric multi-layered film 4 formed at an opposite side of principal surface of the glass substrate 1 having the near infrared absorbing layer 2. The glass substrate 1 and the near infrared absorbing layer 2 can be made as same as the optical filter 10A. The first dielectric multilayered film 3 can be made to be the film having the anti-reflection function as same as the dielectric multilayered film 3 of the optical filter 10B illustrated in FIG. 3.

The second dielectric multilayered film 4 can be made to be a film having an ultraviolet and infrared light reflection function in which, for example, the high refractive index dielectric films and the low refractive index dielectric films are alternately stacked. A method to design the second dielectric multilayered film 4 to be the ultraviolet and infrared light reflection film may be according to a conventional method. A typical example is illustrated in Table 3, but the design when the second dielectric multilayered film 4 used in the embodiments of the present invention is made to be the ultraviolet and infrared light reflection film is not limited thereto.

TABLE 3

|  | Material | Physical Film Thickness (nm) |
| --- | --- | --- |
| 1st Layer | TiO$_2$ | 14.12 |
| 2nd Layer | SiO$_2$ | 36.98 |
| 3rd Layer | TiO$_2$ | 123.17 |
| 4th Layer | SiO$_2$ | 184.89 |
| 5th Layer | TiO$_2$ | 117.52 |
| 6th Layer | SiO$_2$ | 189.03 |
| 7th Layer | TiO$_2$ | 119.1 |
| 8th Layer | SiO$_2$ | 191.04 |
| 9th Layer | TiO$_2$ | 119.95 |
| 10th Layer | SiO$_2$ | 190.39 |
| 11th Layer | TiO$_2$ | 121.39 |
| 12th Layer | SiO$_2$ | 193.44 |
| 13th Layer | TiO$_2$ | 121.93 |
| 14th Layer | SiO$_2$ | 193.28 |
| 15th Layer | TiO$_2$ | 122.86 |
| 16th Layer | SiO$_2$ | 193.93 |
| 17th Layer | TiO$_2$ | 122.85 |
| 18th Layer | SiO$_2$ | 193.67 |
| 19th Layer | TiO$_2$ | 122.5 |
| 20th Layer | SiO$_2$ | 192.92 |
| 21st Layer | TiO$_2$ | 121.86 |
| 22nd Layer | SiO$_2$ | 191.44 |
| 23rd Layer | TiO$_2$ | 120.08 |
| 24th Layer | SiO$_2$ | 186.29 |
| 25th Layer | TiO$_2$ | 113.6 |
| 26th Layer | SiO$_2$ | 172.97 |
| 27th Layer | TiO$_2$ | 103.7 |
| 28th Layer | SiO$_2$ | 164.24 |
| 29th Layer | TiO$_2$ | 98.85 |
| 30th Layer | SiO$_2$ | 161.08 |
| 31st Layer | TiO$_2$ | 96.99 |
| 32nd Layer | SiO$_2$ | 162.66 |
| 33rd Layer | TiO$_2$ | 107.01 |
| 34th Layer | SiO$_2$ | 178.29 |
| 35th Layer | TiO$_2$ | 112.51 |
| 36th Layer | SiO$_2$ | 173.09 |
| 37th Layer | TiO$_2$ | 98.13 |
| 38th Layer | SiO$_2$ | 154.76 |
| 39th Layer | TiO$_2$ | 93.36 |
| 40th Layer | SiO$_2$ | 152.12 |
| 41st Layer | TiO$_2$ | 89.59 |
| 42nd Layer | SiO$_2$ | 149.76 |
| 43rd Layer | TiO$_2$ | 89.73 |
| 44th Layer | SiO$_2$ | 147.84 |
| 45th Layer | TiO$_2$ | 88.43 |
| 46th Layer | SiO$_2$ | 147.48 |
| 47th Layer | TiO$_2$ | 88.36 |
| 48th Layer | SiO$_2$ | 148.04 |
| 49th Layer | TiO$_2$ | 88.26 |
| 50th Layer | SiO$_2$ | 147.35 |
| 51st Layer | TiO$_2$ | 88.51 |
| 52nd Layer | SiO$_2$ | 149.1 |
| 53rd Layer | TiO$_2$ | 87.72 |
| 54th Layer | SiO$_2$ | 148.07 |
| 55th Layer | TiO$_2$ | 88.13 |
| 56th Layer | SiO$_2$ | 149.31 |
| 57th Layer | TiO$_2$ | 88.01 |
| 58th Layer | SiO$_2$ | 149.02 |
| 59th Layer | TiO$_2$ | 89.3 |
| 60th Layer | SiO$_2$ | 148.56 |
| 61st Layer | TiO$_2$ | 89.32 |
| 62nd Layer | SiO$_2$ | 150.97 |
| 63rd Layer | TiO$_2$ | 91.13 |
| 64th Layer | SiO$_2$ | 150.96 |
| 65th Layer | TiO$_2$ | 94.47 |
| 66th Layer | SiO$_2$ | 158.34 |
| 67th Layer | TiO$_2$ | 96.89 |
| 68th Layer | SiO$_2$ | 81.44 |

Besides, a constitution to reduce a surface reflection such as a moth-eye structure may be provided to increase use efficiency of light. The moth-eye structure is a structure in which a regular projection array is formed at a cycle smaller than, for example, 400 nm, and it is a structure in which effective refractive indexes continuously change in a thickness direction, and therefore, a surface reflectance of light whose wavelength is longer than the cycle is suppressed, and it can be formed at a surface of the optical filter by a molding, or the like.

Figure 5A:
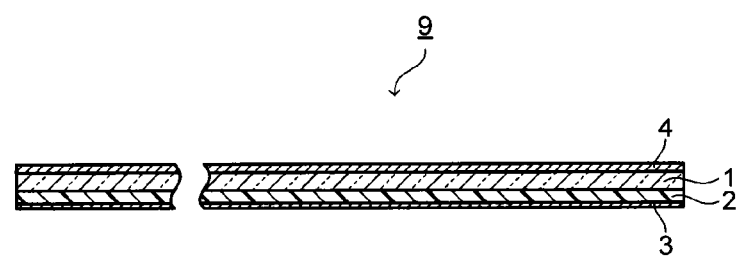
FIG. 5A is a view schematically illustrating a dicing process (a process preparing a base material) when the optical filter illustrated in FIG. 4 is manufactured.
Figure 5B:
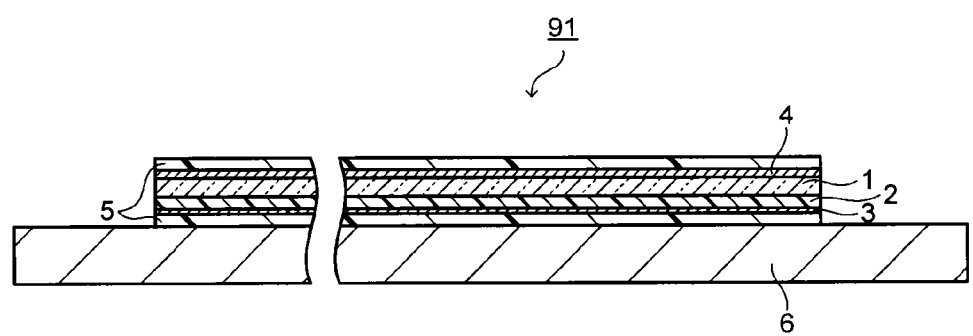
FIG. 5B is a view schematically illustrating the dicing process (a process fixing to a holding substrate) when the optical filter illustrated in FIG. 4 is manufactured.
Figure 5C:
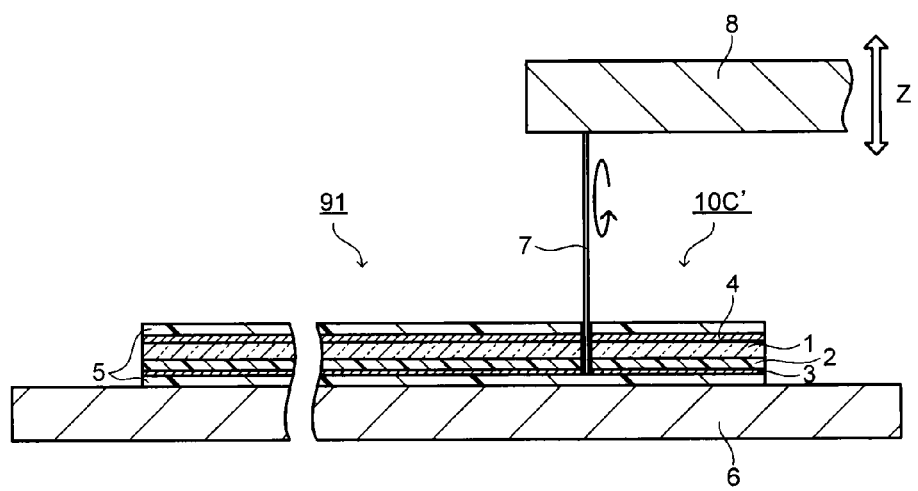
FIG. 5C is a view schematically illustrating the dicing process when the optical filter illustrated in FIG. 4 is manufactured.

Hereinabove, the constitution, the forming method and the stacking method of each constitution layer of the optical filter according to the embodiments of the present invention are exemplified to be described. When the optical filter according to the embodiments of the present invention is manufactured, it is general that a base material obtained in a size larger than an actually used size is cut by dicing to be processed into a production size. FIG. 5A to FIG. 5C are views schematically illustrating dicing processes when the optical filter 10C illustrated in FIG. 4 is manufactured.

Figure 6:
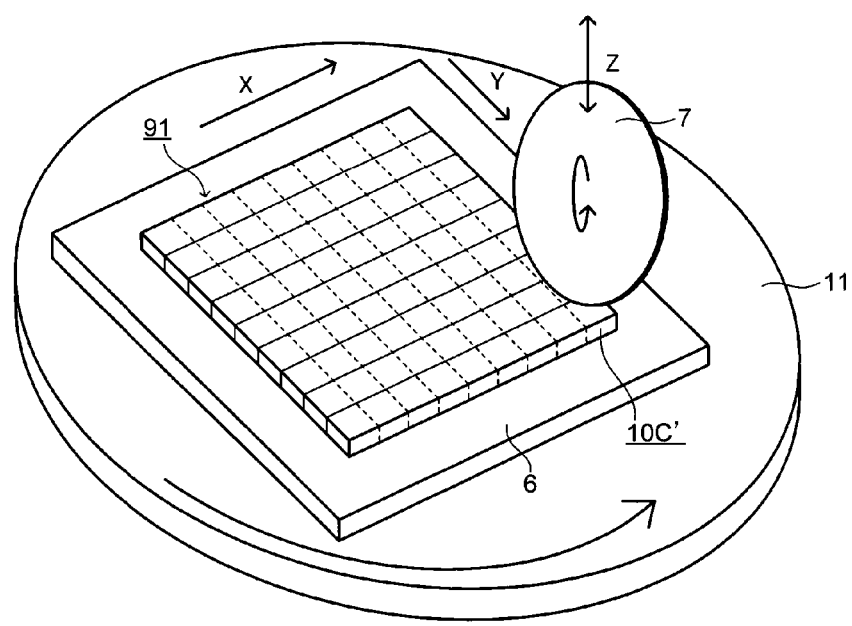
FIG. 6 is an exterior view illustrating a movement of a dicing blade at a cutting time illustrated in FIG. 5C.

FIG. 5A is a base material 9 to obtain the optical filter 10C, and it has a constitution as same as the optical filter 10C except that vertical and horizontal sizes are large sizes. In the dicing process, at first, protective films 5 are adhered on both principal surfaces of the base material 9, then it is fixed on a holding substrate 6 as a cutting object 91 (FIG. 5B). Next, the base material 9 with the protective films 5 (cutting object 91) is set on a cutting table 11 of a dicing saw to be cut with a dicing blade. FIG. 5C is a view illustrating a sectional view of the cutting object 91 at a cutting time by a dicing blade 7, and FIG. 6 is an exterior view illustrating movements of the dicing blade 7 and the cutting table 11 at the cutting time illustrated in FIG. 5C.

The cutting of the cutting object 91 is performed by a movement of the cutting table 11 in a direction in parallel to a surface of the dicing blade 7 (Y direction in FIG. 6) relative to a head 8 capable of moving up and down (Z direction in the drawing) to which the dicing blade 7 is rotatably arranged. When the dicing blade 7 reaches an end of the cutting object 91 in Y direction, the cutting table 11 moves in a direction perpendicular to the surface of the dicing blade 7 (X direction in FIG. 6), and the cuttings in Y direction are sequentially performed. Note that the cuttings in X axis direction are performed by a similar operation after the cutting table 11 is turned for 90 degrees. Separated pieces 10C' to be the production size by the cuttings are used as the near infrared absorption filter 10C illustrated in FIG. 4 after processes of cleaning and so on, and the protective films 5 are removed.

Conventionally, there has been a problem in which load is applied to the base material 9 in a sectional direction by the cutting with the dicing saw as stated above, and peeling may occur between the near infrared absorbing layer 2 and the glass substrate 1. However, in the embodiments of the present invention, the peeling seldom occurs between the near infrared absorbing layer 2 and the glass substrate 1 at the base material 9 even if it is cut by the dicing saw, and it is possible to contribute to improvement of manufacturing yield.

The optical filter according to the embodiments of the present invention is able to be used as optical filters of imaging devices such as a digital still camera, a digital video camera, a monitoring camera, a camera for vehicle, a web camera, and an automatic exposure meter and so on, an optical filter for PDP, and so on. The optical filter according to the embodiments of the present invention is suitably used in a solid-state imaging device such as the digital still camera, the digital video camera, the monitoring camera, the camera for vehicle, the web camera, and the optical filter is disposed, for example, between an imaging lens and a solid-state image sensor.

Figure 7:
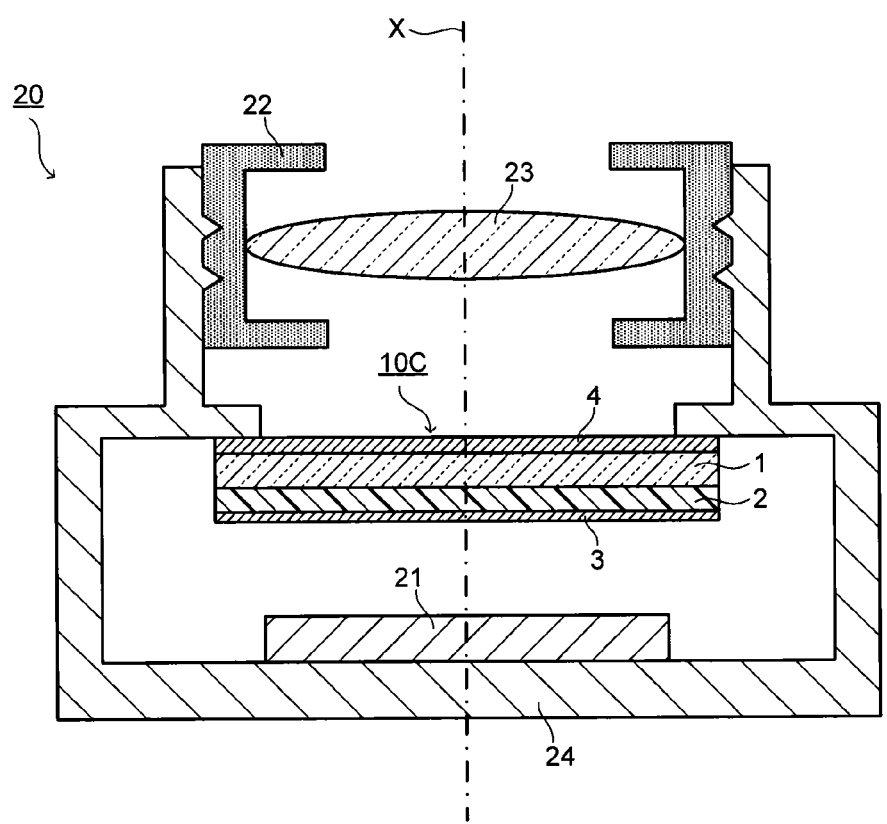
FIG. 7 is a sectional view illustrating an example of an embodiment of a solid-state image device according to the present invention.

Hereinafter, an example of a solid-state imaging device according to the embodiments of the present invention in which the optical filter according to the embodiments of the present invention is disposed to be used between the imaging lens and the solid-state image sensor is described with reference to FIG. 7. FIG. 7 is a sectional view schematically illustrating an essential part of the example of the solid-state imaging device using the optical filter 10C. This solid-state imaging device 20 includes a solid-state image sensor 21, the optical filter 10C at a front surface thereof, and an imaging lens 23 in this sequence, and further includes a casing 24 fixing the above. The imaging lens 23 is fixed by a lens unit 22 further provided inside the casing 24. The optical filter 10C is disposed such that the first dielectric multilayered film 3 positions at the solid-state image sensor 21 side, and the second dielectric multilayered film 4 positions at the imaging lens 23 side. The solid-state image sensor 21, the optical filter 10C and the imaging lens 23 are disposed along an optical axis x.

The solid-state imaging device according to the embodiments of the present invention is a solid-state imaging device capable of maintaining high reliability even in uses under the high temperature and high moisture environment by using the optical filter according to the embodiments of the present invention.

EXAMPLES

Hereinafter, the present invention is described in more detail by examples. Incidentally, the following description is not intended to limit the present invention. Examples 1 to 6 are examples, and an example 7 is a comparative example. Note that the transmittance and the variation D of the transmittance in the examples are measured by methods illustrated in the following.

[Transmittance and Variation D of Transmittance]

Transmission spectra (transmittance) were measured by using an ultraviolet-visible spectrophotometer (manufactured by Hitachi High Technologies Co., Ltd., U-4100 type) as for the near infrared absorbing layer and the optical filter, and they were calculated.

(Preparation of Composition for Forming the Near Infrared Absorbing Layers 1 to 7)

Fluorene polyester (B-OKP2; brand name, manufactured by Osaka Gas Chemicals Co., Ltd., refractive index: 1.64) for 15 g as the transparent resin, 3-glycidoxypropyltriethoxysilane (KBM403; brand name, manufactured by Shin-Etsu Silicone Co., Ltd.) as the silane coupling agent in six kinds of ratios illustrated in Table 4 each within a range of ratio of 0.5 parts by mass to 15 parts by mass relative to 100 parts by mass of the fluorene polyester were added and dissolved into cyclohexanon for 85 g. Further, the NIR absorbing dye (F12-2) for 0.21 g was added and dissolved into each of the above as the NIR absorbing dye (B1) to obtain composition for forming the near infrared absorbing layers 1 to 6. Besides, a composition for forming the near infrared absorbing layer 7 was prepared as same as the composition for forming the near infrared absorbing layers 1 to 6 except that the silane coupling agent was not added.

Examples 1 to 7

Manufacturing of Optical Filters 1 to 7

The composition for forming the near infrared absorbing layer 1 was coated on a glass substrate (non-alkali glass: AN100 (manufactured by Asahi Glass Co., Ltd.), 100 mm×100 mm, thickness: 0.7 mm) by the spin coating at a rotation of 800 rpm, it was dried in two stages at 90° C. for 5 minutes, and at 150° C. for 5 minutes, and thereafter, heat treatment was performed by an oven under atmosphere of 150° C. for one hour to obtain a base material for the optical filter 1 having the near infrared absorbing layer with the thickness of 3 μm on the glass substrate. The base material for the optical filter 1 was cut into a production size (5 mm×5 mm) as same as the method illustrated in FIG. 5A to FIG. 5C, to obtain the optical filter 1.

The optical filters 2 to 7 were obtained as same as the above except that the composition for forming the near infrared absorbing layers 2 to 7 were used instead of the composition for forming the near infrared absorbing layer 1 in the above.

(Evaluation)

Each one of the obtained optical filters 1 to 7 was set as a test sample, an initial transmittance thereof was measured to obtain spectral characteristics at the near infrared absorbing layer of each optical filter. After that, the following spectral reliability test was performed as for the same test sample. Further, adhesiveness evaluation was performed by using each three pieces of other test samples as for the optical filters 1 to 7.

(Measurement of Initial Transmittance)

The transmittance of the optical filter 1 obtained in the above was measured. A result in which a measurement result of the transmittance measured as for the glass substrate whose thickness was 0.7 mm where the near infrared absorbing layer was not formed was subtracted from the transmission result of the optical filter 1 is illustrated in FIG. 2 and Table 4. The initial transmittances were similarly measured as for the optical filters 2 to 7, then all of the results were similar to the transmittance of the optical filter 1. Here, the transmittance at 450 nm to 600 nm is 89.5% or more means that the wavelength region having the transmittance of less than 89.5% does not exist at the wavelength range, and when the transmittance at 695 nm to 720 nm is 4.5% or less means that the wavelength region of the transmittance exceeding 4.5% does not exist at the wavelength range.

(Spectral Reliability Test)

The optical filters 1 to 7 were left under a condition of 85° C., 85% RH, and the transmittances were measured after 168 hours and 300 hours. Obtained transmittances and the initial transmittances were compared by using the following criteria to make them evaluations of the spectral reliabilities. Results thereof are illustrated in Table 4.

A . . . A difference between the transmittance at 700 nm after the test and the initial transmittance at the same wavelength is within ±1%.

B . . . A difference between the transmittance at 700 nm after the test and the initial transmittance at the same wavelength exceeds ±1%.

(Evaluation of Adhesiveness)

Each three pieces of the obtained optical filters 1 to 7 were immersed into hot water at 90° C., and each one of them were taken out after 3 hours, 6 hours, and 12 hours (accelerating test) to make them adhesiveness evaluation samples. A tape peeling test was performed by a method based on JIS K6854 as for each adhesiveness evaluation sample, and they were evaluated by the following criteria. Cellotape (trademark (manufactured by Nichiban Co., Ltd.)) was used as the tape. Results thereof are illustrated in Table 4.

A . . . The near infrared absorbing layer is held on the glass substrate.

B . . . The near infrared absorbing layer is not held on the glass substrate.

TABLE 4

|  |  |  | Example | | | | | | |
| --- | --- | --- | --- | --- | --- | --- | --- | --- | --- |
|  |  |  | 1 | 2 | 3 | 4 | 5 | 6 | 7 |
| Composition for forming the near infrared absorbing layer abbreviation | | | 1 | 2 | 3 | 4 | 5 | 6 | 7 |
| Solid contents composition (parts by mass) | B-OKP2 | | 100 | 100 | 100 | 100 | 100 | 100 | 100 |
|  | KBM403 | | 0.5 | 1 | 3 | 5 | 10 | 15 | 0 |
|  | NIR Absorbing Dye(F12-2) | | 1.4 | 1.4 | 1.4 | 1.4 | 1.4 | 1.4 | 1.4 |
| Optical Filter Abbreviation | | | 1 | 2 | 3 | 4 | 5 | 6 | 7 |
| Light absorption characteristics of near infrared absorbing layer | Transmittance (%) | 630 nm | 67.6 | | | | | | |
|  |  | 700 nm | 1.9 | | | | | | |
|  |  | 450 to 600 nm | 89.5 or more | | | | | | |
|  |  | 695 to 720 nm | 4.5 or less | | | | | | |
|  | Variation D (%/nm) | | −0.94 | | | | | | |
| Spectral reliability of optical filter | 168 hours | | A | A | A | A | A | A | A |
|  | 300 hours | | A | A | A | A | A | A | A |
| Adhesiveness evaluation | 90° C. hot water immersion | Initial | A | A | A | A | A | A | A |
|  |  | 3 hours later | A | A | A | A | A | A | B |
|  |  | 6 hours later | B | A | A | A | A | A | B |
|  |  | 12 hours later | B | B | A | A | A | A | B |

It can be seen from Table 4 that the adhesiveness between the glass substrate 1 and the near infrared absorbing layer 2 improves by adding the silane coupling agent (C) into the composition for forming the near infrared absorbing layer. It is conceivable that this is because the silanol group of the silane coupling agent (C) obtained by the hydrolysis is bonded to the glass substrate, and the functional group (epoxy group) is bonded to residue group of fluorenepolyester (carboxyl group).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical filter, comprising:
    a glass substrate; and
    a near infrared absorbing layer formed on one principal surface of the glass substrate;
    wherein:
    the near infrared absorbing layer is obtained by reacting a composition for forming the near infrared absorbing layer on the glass substrate; and
    the composition contains comprises a transparent resin having a fluorene skeleton and a reactivity group; group, a near infrared absorbing dye, and a silane coupling agent and/or oligomer thereof having a hydrolyzable group and a functional group which has reactivity for the reactivity group.

2. The optical filter according to claim 1, wherein the transparent resin is selected from an acrylic resin, a polycarbonate resin, and a polyester resin.

3. The optical filter according to claim 1, wherein the transparent resin is a polyester resin.

4. The optical filter according to claim 1, wherein:
    the composition comprises the near infrared absorbing dye in an amount of 0.2 parts by mass to 10 parts by mass relative to 100 parts by mass of the transparent resin; and
    the composition comprises the silane coupling agent and/or oligomer thereof in an amount of 0.1 parts by mass to 30 parts by mass relative to 100 parts by mass of the transparent resin.

5. The optical filter according to claim 1, wherein the composition comprises the silane coupling agent and/or oligomer thereof in an amount of 0.5 pans by mass to 15 parts by mass relative to 100 parts by mass of the transparent resin.

6. The optical filter according to claim 1, wherein:
    the near infrared absorbing dye comprises a near infrared absorbing dye (B1) having an absorption spectrum of light in wavelength region of 400 nm to 1000 nm measured by dissolving into a solvent for the dye having refractive index ($n_{20}d$) of less than 1.500;
    the absorption spectrum has a maximum absorption peak;
    the maximum absorption peak has a maximum absorption at a wavelength within a region of 695 nm to 720 nm;
    the maximum absorption peak has a full width at half maximum of 60 nm or less;
    if an absorbance at the maximum absorption peak is assigned a value of 1 dividing a difference between the absorbance at the maximum peak and an absorbance at 630 nm by a difference between the wavelength at the maximum absorption peak and 630 nm yields a value of 0.01 to 0.05;
    a refractive index ($n_{20}d$) of the transparent resin is 1.54 or more; and a transmittance of visible light of the near infrared absorbing layer at 450 nm to 600 nm is 70% or more;

a transmittance of light of the near infrared absorbing layer in a wavelength region of 695 nm to 720 nm is 10% or less; and a variation D of transmittance of the near infrared absorbing layer expressed by expression (1) is −0.8 or less;

$$D (\%/nm)=[T_{700} (\%)-T_{630} (\%)]/[700 (nm)-630 (nm)] \quad (1)$$

where $T_{700}$ is a transmittance at a wavelength of 700 nm in a transmission spectrum of the near infrared absorbing layer, and $T_{630}$ is a transmittance at a wavelength of 630 nm in the transmission spectrum of the near infrared absorbing layer.

7. The optical filter according to claim 6, wherein:
the maximum absorption peak in the absorption spectrum of the near infrared absorbing dye (B1) has the maximum absorption at a wavelength within a region of 700 nm to 720 nm; and
the variation D of the transmittance of the near infrared absorbing layer expressed by the expression (1) is −0.86 or less.

8. The optical filter according to claim 6, wherein the near infrared absorbing dye (B1) consists of at least one squarylium-based compound according to formula (F1):

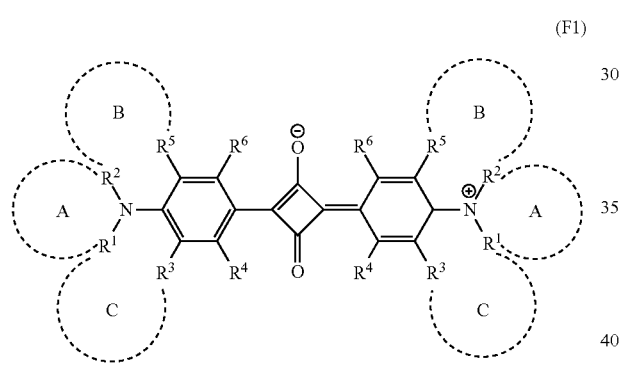

(F1)

where:
$R^4$ and $R^6$ each independently represent a hydrogen atom, a halogen atom, an alkyl group or an alkoxy group having 1 to 6 carbon atoms, or —NR$^7$R$^8$;

$R^7$ and $R^8$ each independently represent a hydrogen atom, an alkyl group having 1 to 20 carbon atoms, or —C(=O) R$^9$;

$R^9$ represents a hydrogen atom, an alkyl group having 1 to 20 carbon atoms, or an aryl group or an alanyl group having 6 to 11 carbon atoms which may have a substituent;

where $R^1$ and $R^2$, $R^2$ and $R^5$, and $R^1$ and $R^3$ may each independently form a heterocycle A, a heterocycle B, and a heterocycle C respectively having 5 or 6 members including a nitrogen atom by coupling with each other;

the formula (F1) has at least one ring structure selected from the heterocycle A, the heterocycle B, and the heterocycle C;

$R^1$ and $R^2$ when the heterocycle A is formed are a divalent group -Q- in which they are bonded, and represent an alkylene group or an alkyleneoxy group in which a hydrogen atom may be substituted by an alkyl group having 1 to 6 carbon atoms or an aryl group having 6 to 10 carbon atoms;

$R^2$ and $R^5$ when the heterocycle B is formed and $R^1$ and $R^3$ when the heterocycle C is formed are respectively divalent groups —X$^1$—Y$^1$— and X$^2$—Y$^2$ in which they are bonded, X$^1$ and X$^2$ being bonded to nitrogen;

X$^1$ and X$^2$ are each expressed by the following formula (1x) or (2x), and Y$^1$ and Y$^2$ are each expressed by any one selected from the following formulas (1y) to (5y), and when each of X$^1$ and X$^2$ is expressed by the formula (2x), each of Y$^1$ and Y$^2$ may be a single bond;

(1x)

(2x)

(1y)

(2y)

(3y)

(4y)

(5y)

each Z independently represents a hydrogen atom, a hydroxyl group, an alkyl group or an alkoxy group having 1 to 6 carbon atoms, or —NR$^{28}$R$^{29}$;

$R^{28}$ and $R^{29}$ each independently represent a hydrogen atom or an alkyl group having 1 to 20 carbon atoms);

$R^{21}$ to $R^{26}$ each represent a hydrogen atom, an alkyl group having 1 to 6 carbon atoms or an aryl group having 6 to 10 carbon atoms;

$R^{27}$ represents an alkyl group having 1 to 6 carbon atoms or an aryl group having 6 to 10 carbon atom;

$R^7$, $R^8$, $R^9$, $R^4$, $R^6$, $R^{21}$ to $R^{27}$, $R^1$ to $R^3$ when the heterocycle is not formed, and $R^5$ may form a 5-membered ring or a 6-membered ring by being bonded to any of the others among these with each other;

$R^{21}$ and $R^{26}$ and $R^{21}$ and $R^{27}$ may be bonded directly;

where $R^1$ and $R^2$ when the heterocycle is not formed each independently represent a hydrogen atom, an alkyl group having 1 to 6 carbon atoms which may have a substituent, an allyl group, an aryl group or an alanyl group having 6 to 11 carbon atoms; and $R^3$ and $R^5$ when the heterocycle is not formed each independently represent a hydrogen atom, a halogen atom, or an alkyl group or an alkoxy group having 1 to 6 carbon atoms.

9. The optical filter according to claim 8, wherein the functional group of the silane coupling agent and/or oligomer thereof is an epoxy group or a (metha)acryloxy group.

10. The optical filter according to claim 1, wherein a thickness of the near infrared-absorbing layer is 0.5 μm to 100 μm.

11. The optical filter according to claim 1, further comprising:
 a dielectric multilayered film on a surface of the near infrared-absorbing layer which is opposite to a surface on the glass substrate.

12. A solid-state imaging device, comprising:
 a lens;
 the optical filter according to claim 1; and
 a solid-state image sensor disposed on an optical axis of light incident from an object side or a light source side in this sequence.

* * * * *